(12) United States Patent
Tsai

(10) Patent No.: US 8,488,255 B2
(45) Date of Patent: Jul. 16, 2013

(54) IMAGE PICKUP OPTICAL SYSTEM

(75) Inventor: Tsung-Han Tsai, Taichung (TW)

(73) Assignee: Largan Precision Co., Taichung (TW)

( * ) Notice: Subject to any disclaimer, the term of this patent is extended or adjusted under 35 U.S.C. 154(b) by 158 days.

(21) Appl. No.: 13/182,896

(22) Filed: Jul. 14, 2011

(65) Prior Publication Data

US 2012/0147482 A1    Jun. 14, 2012

(30) Foreign Application Priority Data

Dec. 9, 2010   (TW) ................................ 99143122 A

(51) Int. Cl.
*G02B 9/60* (2006.01)
*G02B 3/02* (2006.01)
*G02B 13/18* (2006.01)

(52) U.S. Cl.
USPC .......................................... 359/714; 359/764

(58) Field of Classification Search
CPC ..... G02B 3/02; G02B 9/00; G02B 9/60; G02B 6/62; G02B 9/64; G02B 13/18
USPC .................. 359/708–714, 754–758, 763–766
See application file for complete search history.

(56) References Cited

U.S. PATENT DOCUMENTS

| 7,710,665 | B2 | 5/2010 | Park et al. |
| 7,826,151 | B2 | 11/2010 | Tsai |
| 2003/0117722 | A1 | 6/2003 | Chen |
| 2004/0196571 | A1 | 10/2004 | Shinohara |
| 2010/0253829 | A1 | 10/2010 | Shinohara |
| 2010/0254029 | A1 | 10/2010 | Shinohara |
| 2010/0315723 | A1* | 12/2010 | Noda ............................ 359/714 |
| 2011/0115965 | A1* | 5/2011 | Engelhardt et al. ........... 348/345 |

FOREIGN PATENT DOCUMENTS

| JP | 2003131136 A | 5/2003 |
| JP | 2003161879 A | 6/2003 |
| JP | 2003185917 A | 7/2003 |
| JP | 2005266771 A | 9/2005 |
| JP | 2006293042 A | 10/2006 |
| TW | M313246 | 6/2007 |
| TW | M313781 | 6/2007 |
| TW | M332199 | 5/2008 |
| TW | 201022714 | 6/2010 |
| TW | 201038966 | 11/2010 |

* cited by examiner

*Primary Examiner* — Darryl J Collins
(74) *Attorney, Agent, or Firm* — Wang Law Firm, Inc.; Li K. Wang; Stephen Hsu

(57) ABSTRACT

An image pickup optical system, sequentially arranged from an object side to an image side, comprises the first lens element with positive refractive power having a convex object-side surface, the second lens element with negative refractive power having a concave object-side surface and a convex image-side surface, the third lens element with refractive power, the fourth lens element with refractive power having a concave image-side surface, at least one of the surfaces being aspheric, the fifth lens element with refractive power having a concave image-side surface, at least one of the surfaces being aspheric and having at least one inflection point. Each of the five lens elements may be made of plastic with aspherical surfaces. The image pickup optical system satisfies conditions related to the reduction of the total length and the system sensitivity for use in compact cameras and mobile phone cameras functionalities.

26 Claims, 33 Drawing Sheets

Table 1
(Embodiment 1)
f = 4.07 mm, Fno = 2.60, HFOV = 34.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.682040 (ASP) | 0.559 | Plastic | 1.544 | 55.9 | 2.74 |
| 2 | | -11.584500 (ASP) | -0.040 | | | | |
| 3 | Ape. Stop | Plano | 0.217 | | | | |
| 4 | Lens 2 | -2.983170 (ASP) | 0.300 | Plastic | 1.632 | 23.4 | -5.87 |
| 5 | | -15.748000 (ASP) | 0.808 | | | | |
| 6 | Lens 3 | -1.310600 (ASP) | 0.574 | Plastic | 1.530 | 55.8 | 9.80 |
| 7 | | -1.205340 (ASP) | 0.050 | | | | |
| 8 | Lens 4 | 4.152100 (ASP) | 0.418 | Plastic | 1.530 | 55.8 | -5.83 |
| 9 | | 1.709750 (ASP) | 0.197 | | | | |
| 10 | Lens 5 | 1.053800 (ASP) | 0.516 | Plastic | 1.530 | 55.8 | 8.96 |
| 11 | | 1.124530 (ASP) | 0.900 | | | | |
| 12 | IR-filter | Plano | 0.300 | Glass | 1.517 | 64.2 | - |
| 13 | | Plano | 0.290 | | | | |
| 14 | Image | Plano | - | | | | |

Note: Reference wavelength is d-line 587.6nm. ASP stands for aspherical surfaces.

FIG. 9

Table 2
Aspheric Coefficients

| Surface # | 1 | 2 | 4 | 5 | 6 |
|---|---|---|---|---|---|
| k = | -9.45471E-01 | 1.00000E+00 | -2.94319E+01 | 1.00000E+00 | -2.41170E+00 |
| A4 = | 2.87969E-03 | -3.28838E-02 | 3.04942E-02 | 2.07099E-01 | -1.53537E-01 |
| A6 = | 1.01261E-02 | -1.03498E-01 | 6.76673E-02 | -4.34339E-02 | 3.54951E-02 |
| A8 = | -1.58496E-01 | -3.90341E-02 | -4.33753E-02 | 5.49115E-02 | -1.05160E-01 |
| A10 = | 3.05270E-01 | 5.69489E-01 | -2.22366E-01 | -1.35342E-02 | 1.00432E-01 |
| A12 = | -5.20540E-01 | -1.02129E+00 | 2.19885E-01 | -9.65694E-02 | 3.49743E-03 |
| A14 = | 3.86619E-01 | -3.41685E-01 | 2.09379E-01 | 1.36113E-01 | -1.45214E-02 |
| A16= | -1.59312E-01 | 1.15796E+00 | -1.66569E-01 | -1.46177E-02 | -1.48801E-03 |

| Surface # | 7 | 8 | 9 | 10 | 11 |
|---|---|---|---|---|---|
| k = | -9.92394E-01 | -7.07453E-01 | -1.84628E+01 | -6.22635E+00 | -5.02359E+00 |
| A4 = | -5.27051E-02 | -2.63149E-02 | 1.34526E-02 | -6.05379E-02 | -4.54212E-02 |
| A6 = | 2.09687E-02 | 7.38431E-03 | -9.03525E-03 | 6.95068E-03 | 2.97076E-03 |
| A8 = | -3.22129E-02 | -3.96261E-03 | 5.09562E-04 | -1.32099E-04 | -4.78764E-06 |
| A10 = | 1.02758E-02 | 9.26237E-04 | 1.94095E-04 | | |
| A12 = | 7.20326E-03 | 1.57552E-05 | -2.16489E-06 | | |
| A14 = | 2.55439E-03 | -4.71047E-05 | -1.18821E-05 | | |
| A16= | -2.24879E-03 | 5.07558E-06 | 1.26241E-06 | | |

FIG. 10

Table 3
(Embodiment 2)
f = 3.93 mm, Fno = 2.40, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.807530 (ASP) | 0.569 | Plastic | 1.544 | 55.9 | 3.11 |
| 2 | | -23.474200 (ASP) | -0.017 | | | | |
| 3 | Ape. Stop | Plano | 0.267 | | | | |
| 4 | Lens 2 | -2.723990 (ASP) | 0.300 | Plastic | 1.634 | 23.8 | -6.34 |
| 5 | | -8.801300 (ASP) | 0.873 | | | | |
| 6 | Lens 3 | -1.971950 (ASP) | 0.700 | Plastic | 1.544 | 55.9 | 5.16 |
| 7 | | -1.303560 (ASP) | 0.050 | | | | |
| 8 | Lens 4 | 4.385200 (ASP) | 0.468 | Plastic | 1.544 | 55.9 | -11.88 |
| 9 | | 2.514630 (ASP) | 0.199 | | | | |
| 10 | Lens 5 | 1.194240 (ASP) | 0.410 | Plastic | 1.544 | 55.9 | -18.32 |
| 11 | | 0.937440 (ASP) | 0.900 | | | | |
| 12 | IR-filter | Plano | 0.300 | Glass | 1.517 | 64.2 | - |
| 13 | | Plano | 0.192 | | | | |
| 14 | Image | Plano | - | | | | |

Note: Reference wavelength is d-line 587.6nm. ASP stands for aspherical surfaces.

FIG. 11

Table 4
Aspheric Coefficients

| Surface # | 1 | 2 | 4 | 5 | 6 |
|---|---|---|---|---|---|
| k = | -6.33704E-01 | 1.00000E+00 | -2.65112E+01 | 1.00000E+00 | -6.02415E+00 |
| A4 = | 1.05469E-02 | 2.37001E-03 | -3.69428E-04 | 1.89266E-01 | -9.71698E-02 |
| A6 = | 1.68753E-02 | -5.89475E-02 | 2.56188E-02 | -1.16085E-01 | 5.47456E-02 |
| A8 = | -1.20733E-01 | -2.56859E-01 | -2.89294E-02 | 6.49452E-02 | -1.09210E-01 |
| A10 = | 3.09138E-01 | 1.07472E+00 | -2.96196E-01 | 9.58290E-04 | 7.89500E-02 |
| A12 = | -5.04930E-01 | -1.42550E+00 | 2.38257E-01 | -9.43703E-02 | -8.09449E-03 |
| A14 = | 3.79340E-01 | -3.42144E-01 | 2.09002E-01 | 1.01027E-01 | -8.53816E-03 |
| A16= | -1.42610E-01 | 1.15782E+00 | -1.66361E-01 | -1.43725E-02 | 1.88548E-03 |

| Surface # | 7 | 8 | 9 | 10 | 11 |
|---|---|---|---|---|---|
| k = | -1.10736E+00 | -2.29998E+00 | -1.69674E+01 | -6.44446E+00 | -4.07187E+00 |
| A4 = | -3.86521E-02 | -2.96304E-02 | 1.55633E-02 | -4.60803E-02 | -4.10487E-02 |
| A6 = | 3.36907E-02 | 7.35918E-03 | -1.01109E-02 | 6.72042E-03 | 4.72049E-03 |
| A8 = | -3.42497E-02 | -3.19513E-03 | 5.18362E-04 | -2.55725E-04 | -1.61309E-04 |
| A10 = | 4.45654E-03 | 8.71851E-04 | 2.44980E-04 | | |
| A12 = | 3.62192E-03 | 1.11675E-05 | 2.64330E-06 | | |
| A14 = | 1.79091E-03 | -4.38915E-05 | -1.24149E-05 | | |
| A16= | -8.95392E-04 | 4.82880E-06 | 1.15742E-06 | | |

FIG. 12

Table 5
(Embodiment 3)
f = 3.63 mm, Fno = 2.50, HFOV = 37.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.868340 (ASP) | 0.505 | Plastic | 1.544 | 55.9 | 3.69 |
| 2 | | 23.988500 (ASP) | 0.014 | | | | |
| 3 | Ape. Stop | Plano | 0.315 | | | | |
| 4 | Lens 2 | -4.231500 (ASP) | 0.285 | Plastic | 1.634 | 23.8 | -8.70 |
| 5 | | -18.622000 (ASP) | 0.613 | | | | |
| 6 | Lens 3 | -2.076470 (ASP) | 0.808 | Plastic | 1.544 | 55.9 | 3.64 |
| 7 | | -1.152420 (ASP) | 0.070 | | | | |
| 8 | Lens 4 | 3.702900 (ASP) | 0.352 | Plastic | 1.634 | 23.8 | -5.55 |
| 9 | | 1.736980 (ASP) | 0.140 | | | | |
| 10 | Lens 5 | 1.126250 (ASP) | 0.498 | Plastic | 1.544 | 55.9 | 55.27 |
| 11 | | 0.987750 (ASP) | 0.900 | | | | |
| 12 | IR-filter | Plano | 0.300 | Glass | 1.517 | 64.2 | - |
| 13 | | Plano | 0.295 | | | | |
| 14 | Image | Plano | - | | | | |

Note: Reference wavelength is d-line 587.6nm. ASP stands for aspherical surfaces.

FIG. 13

Table 6
Aspheric Coefficients

| Surface # | 1 | 2 | 4 | 5 | 6 |
|---|---|---|---|---|---|
| k = | -6.40552E-01 | 1.00000E+00 | -2.67958E+01 | 1.00000E+00 | -8.33836E+00 |
| A4 = | 9.38371E-03 | -2.81357E-02 | -1.54013E-02 | 9.96423E-02 | -9.82104E-02 |
| A6 = | 2.42512E-02 | 2.14351E-02 | -5.57767E-02 | -3.12001E-02 | 8.65503E-02 |
| A8 = | -1.43219E-01 | -5.30102E-01 | -7.68445E-02 | -4.94063E-02 | -7.89463E-02 |
| A10 = | 2.97358E-01 | 1.36358E-01 | -4.85670E-02 | -3.92647E-02 | 8.01168E-02 |
| A12 = | -4.86142E-01 | -1.49786E+00 | 1.58342E-02 | 6.49117E-02 | -1.61177E-02 |
| A14 = | 3.94608E-01 | -3.42147E-01 | 2.08999E-01 | -5.52247E-03 | -1.21780E-02 |
| A16= | -1.76963E-01 | 1.15782E+00 | -1.66362E-01 | -1.38668E-02 | 4.14736E-03 |

| Surface # | 7 | 8 | 9 | 10 | 11 |
|---|---|---|---|---|---|
| k = | -1.36499E+00 | -8.01493E-02 | -1.08522E+01 | -6.75927E+00 | -4.72217E+00 |
| A4 = | -2.82691E-02 | -2.95515E-02 | 1.01977E-02 | -3.89225E-02 | -3.33502E-02 |
| A6 = | 2.48293E-02 | 4.92266E-03 | -6.91568E-03 | 4.74237E-03 | 2.25744E-03 |
| A8 = | -3.10412E-02 | -3.13344E-03 | 1.86861E-04 | -1.16882E-04 | -1.99009E-05 |
| A10 = | 7.83559E-03 | 8.93183E-04 | 1.93863E-04 | | |
| A12 = | 4.75291E-03 | 1.47372E-05 | 9.09196E-06 | | |
| A14 = | 1.87172E-03 | -4.30127E-05 | -1.10009E-05 | | |
| A16= | -1.26359E-03 | 4.62950E-06 | 1.01145E-06 | | |

FIG. 14

Table 7
(Embodiment 4)
f=3.81 mm, Fno = 2.50, HFOV = 36.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.482100 (ASP) | 0.473 | Plastic | 1.544 | 55.9 | 3.17 |
| 2 | | -5.275300 (ASP) | -0.069 | | | | |
| 3 | Ape. Stop | Plano | 0.195 | | | | |
| 4 | Lens 2 | -3.561500 (ASP) | 0.280 | Plastic | 1.634 | 23.8 | -6.99 |
| 5 | | -18.641800 (ASP) | 0.981 | | | | |
| 6 | Lens 3 | -2.058560 (ASP) | 0.719 | Plastic | 1.544 | 55.9 | 3.50 |
| 7 | | -1.111420 (ASP) | 0.100 | | | | |
| 8 | Lens 4 | 4.882600 (ASP) | 0.350 | Plastic | 1.634 | 23.8 | -6.25 |
| 9 | | 2.125900 (ASP) | 0.312 | | | | |
| 10 | Lens 5 | 1.144790 (ASP) | 0.409 | Plastic | 1.544 | 55.9 | -12.80 |
| 11 | | 0.859370 (ASP) | 0.900 | | | | |
| 12 | IR-filter | Plano | 0.300 | Glass | 1.517 | 64.2 | - |
| 13 | | Plano | 0.237 | | | | |
| 14 | Image | Plano | - | | | | |

Note: Reference wavelength is d-line 587.6nm. ASP stands for aspherical surfaces.

FIG. 15

Table 8
Aspheric Coefficients

| Surface # | 1 | 2 | 4 | 5 | 6 |
|---|---|---|---|---|---|
| k = | -2.92243E+00 | 1.00000E+00 | -4.42123E+01 | 1.00000E+00 | -3.71268E+00 |
| A4 = | -1.12641E-02 | -2.59290E-02 | 1.59789E-02 | 1.29061E-01 | -1.10699E-01 |
| A6 = | -6.55968E-03 | 1.67157E-02 | 1.13618E-03 | -5.48590E-02 | 8.07845E-02 |
| A8 = | -1.39723E-01 | -6.07533E-01 | 8.43722E-04 | 1.73407E-02 | -8.08691E-02 |
| A10 = | 2.54923E-01 | 1.51627E+00 | -2.38066E-01 | -5.19753E-02 | 8.14181E-02 |
| A12 = | -4.64461E-01 | -1.60752E+00 | 1.56209E-01 | 7.26524E-02 | -1.30344E-02 |
| A14 = | 3.62984E-01 | -3.42107E-01 | 2.08894E-01 | -6.09352E-02 | -1.18989E-02 |
| A16= | -1.88716E-01 | 1.15786E+00 | -1.66360E-01 | 2.50947E-02 | 3.15845E-03 |

| Surface # | 7 | 8 | 9 | 10 | 11 |
|---|---|---|---|---|---|
| k = | -1.30908E+00 | 1.45052E+00 | -1.01755E+01 | -6.93350E+00 | -4.40463E+00 |
| A4 = | -3.18942E-02 | -1.79478E-02 | 9.20745E-03 | -4.45304E-02 | -3.90714E-02 |
| A6 = | 2.62980E-02 | 3.52974E-03 | -6.72114E-03 | 4.34382E-03 | 3.68975E-03 |
| A8 = | -2.76140E-02 | -3.77207E-03 | 1.39216E-04 | -1.06323E-04 | -3.07308E-04 |
| A10 = | 8.74092E-03 | 8.87193E-04 | 1.72944E-04 | | |
| A12 = | 4.84348E-03 | 2.18680E-05 | 1.01707E-05 | | |
| A14 = | 1.67615E-03 | -4.17674E-05 | -1.05378E-05 | | |
| A16= | -1.38629E-03 | 4.08079E-06 | 1.02243E-06 | | |

FIG. 16

Table 9
(Embodiment 5)
f = 3.95 mm, Fno = 2.80, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.885710 (ASP) | 0.496 | Plastic | 1.544 | 55.9 | 3.07 |
| 2 | | -13.297000 (ASP) | -0.029 | | | | |
| 3 | Ape. Stop | Plano | 0.294 | | | | |
| 4 | Lens 2 | -3.020400 (ASP) | 0.306 | Plastic | 1.632 | 23.4 | -5.53 |
| 5 | | -23.098600 (ASP) | 0.726 | | | | |
| 6 | Lens 3 | -2.212370 (ASP) | 0.576 | Plastic | 1.530 | 55.8 | 3.60 |
| 7 | | -1.116750 (ASP) | 0.144 | | | | |
| 8 | Lens 4 | 3.406400 (ASP) | 0.475 | Plastic | 1.530 | 55.8 | -2.24 |
| 9 | | 0.837940 (ASP) | 0.157 | | | | |
| 10 | Lens 5 | 0.812070 (ASP) | 0.405 | Plastic | 1.530 | 55.8 | 3.94 |
| 11 | | 1.099620 (ASP) | 0.900 | | | | |
| 12 | IR-filter | Plano | 0.300 | Glass | 1.517 | 64.2 | - |
| 13 | | Plano | 0.299 | | | | |
| 14 | Image | Plano | - | | | | |

Note: Reference wavelength is d-line 587.6nm. ASP stands for aspherical surfaces.

FIG. 17

Table 10
Aspheric Coefficients

| Surface # | 1 | 2 | 4 | 5 | 6 |
|---|---|---|---|---|---|
| k = | -7.38285E-01 | 1.00000E+00 | -1.64417E+01 | 1.00000E+00 | -1.14415E+01 |
| A4 = | 5.32556E-03 | -3.22971E-02 | -5.72832E-02 | 6.97051E-02 | -1.29849E-01 |
| A6 = | -1.76123E-02 | -2.22142E-01 | -1.29513E-01 | -1.04379E-01 | 1.39040E-01 |
| A8 = | -8.37362E-02 | 3.39286E-01 | -9.59596E-02 | -3.16140E-02 | -9.78589E-02 |
| A10 = | 1.58866E-02 | -6.11564E-01 | -3.96521E-02 | 8.00657E-02 | 2.85558E-02 |
| A12 = | -3.59703E-02 | 2.28488E-02 | 2.35959E-01 | -2.47862E-03 | -5.57419E-03 |
| A14 = | -2.52402E-02 | -3.41950E-01 | 2.44547E-01 | 3.96299E-02 | 1.09115E-02 |
| A16= | -2.50876E-01 | 1.15789E+00 | -1.46879E-01 | -2.80713E-02 | -8.69958E-03 |

| Surface # | 7 | 8 | 9 | 10 | 11 |
|---|---|---|---|---|---|
| k = | -1.70791E+00 | -1.55843E+02 | -1.03061E+01 | -6.90787E+00 | -5.97867E+00 |
| A4 = | -2.39155E-02 | -2.43622E-02 | -2.69001E-02 | -2.81688E-02 | -3.13104E-02 |
| A6 = | 3.00096E-02 | 1.18772E-02 | 2.95315E-03 | -2.89564E-04 | 5.73689E-04 |
| A8 = | -3.66630E-03 | -2.44224E-03 | -8.13585E-04 | 1.17495E-04 | 1.68726E-04 |
| A10 = | 1.09280E-02 | 2.62527E-04 | 6.44580E-05 | 1.14750E-05 | 1.40037E-05 |
| A12 = | -1.14930E-03 | 6.78506E-06 | -6.24516E-07 | 1.80508E-06 | 3.93993E-07 |
| A14 = | -9.82636E-04 | -5.49563E-06 | 7.54003E-08 | 3.45250E-08 | -9.05657E-08 |
| A16= | -1.70592E-04 | 4.66703E-07 | 1.76401E-07 | -6.63317E-09 | -3.11119E-08 |

FIG. 18

Table 11
(Embodiment 6)
f = 3.73 mm, Fno = 2.50, HFOV = 36.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.687300 (ASP) | 0.568 | Plastic | 1.544 | 55.9 | 3.73 |
| 2 | | 8.818300 (ASP) | 0.069 | | | | |
| 3 | Ape. Stop | Plano | 0.306 | | | | |
| 4 | Lens 2 | -3.146600 (ASP) | 0.285 | Plastic | 1.634 | 23.8 | -8.87 |
| 5 | | -7.392100 (ASP) | 0.522 | | | | |
| 6 | Lens 3 | -2.411330 (ASP) | 0.804 | Plastic | 1.544 | 55.9 | 3.82 |
| 7 | | -1.247900 (ASP) | 0.070 | | | | |
| 8 | Lens 4 | 4.383300 (ASP) | 0.350 | Plastic | 1.544 | 55.9 | -4.67 |
| 9 | | 1.563320 (ASP) | 0.170 | | | | |
| 10 | Lens 5 | 1.011240 (ASP) | 0.457 | Plastic | 1.544 | 55.9 | 14.64 |
| 11 | | 0.973790 (ASP) | 0.900 | | | | |
| 12 | IR-filter | Plano | 0.300 | Glass | 1.517 | 64.2 | - |
| 13 | | Plano | 0.297 | | | | |
| 14 | Image | Plano | - | | | | |

Note: Reference wavelength is d-line 587.6nm. ASP stands for aspherical surfaces.

FIG. 19

Table 12
Aspheric Coefficients

| Surface # | 1 | 2 | 4 | 5 | 6 |
|---|---|---|---|---|---|
| k = | -3.21901E-01 | 1.00000E+00 | -1.10823E+01 | 1.00000E+00 | -1.11583E+01 |
| A4 = | 1.79362E-02 | -7.32412E-03 | -2.25271E-02 | 9.89988E-02 | -1.02909E-01 |
| A6 = | 3.20918E-02 | 3.44562E-02 | -3.69100E-02 | -2.65107E-02 | 8.39509E-02 |
| A8 = | -1.25698E-01 | -4.94778E-01 | -1.06196E-01 | -4.06432E-02 | -7.97588E-02 |
| A10 = | 3.12623E-01 | 1.33220E+00 | -8.94391E-02 | -4.57621E-02 | 8.03500E-02 |
| A12 = | -4.80417E-01 | -1.50904E+00 | 2.97609E-02 | 5.98327E-02 | -1.56610E-02 |
| A14 = | 3.86857E-01 | -3.42144E-01 | 2.09002E-01 | -5.16441E-03 | -1.19501E-02 |
| A16= | -1.56040E-01 | 1.15782E+00 | -1.66361E-01 | -4.49540E-03 | 3.95697E-03 |

| Surface # | 7 | 8 | 9 | 10 | 11 |
|---|---|---|---|---|---|
| k = | -1.22788E+00 | -1.64176E+00 | -1.09136E+01 | -5.28798E+00 | -4.16393E+00 |
| A4 = | -3.35661E-02 | -3.31007E-02 | 1.09934E-02 | -4.53324E-02 | -3.83343E-02 |
| A6 = | 2.48704E-02 | 6.79153E-03 | -7.86588E-03 | 4.32802E-03 | 1.29807E-03 |
| A8 = | -3.02891E-02 | -2.81504E-03 | 1.86577E-04 | -7.07298E-05 | 1.46118E-04 |
| A10 = | 8.25708E-03 | 8.88335E-04 | 2.21020E-04 | | |
| A12 = | 4.86069E-03 | 6.22224E-06 | 1.25242E-05 | | |
| A14 = | 1.85486E-03 | -4.43169E-05 | -1.11775E-05 | | |
| A16= | -1.30196E-03 | 4.80665E-06 | 8.15263E-07 | | |

FIG. 20

Table 13
(Embodiment 7)
f=3.68 mm, Fno = 2.70, HFOV = 37.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.104 | | | | |
| 2 | Lens 1 | 1.721890 (ASP) | 0.532 | Plastic | 1.544 | 55.9 | 3.06 |
| 3 | | -43.223400 (ASP) | 0.291 | | | | |
| 4 | Lens 2 | -2.180620 (ASP) | 0.300 | Plastic | 1.634 | 23.8 | -5.92 |
| 5 | | -5.485500 (ASP) | 0.590 | | | | |
| 6 | Lens 3 | -2.320630 (ASP) | 0.564 | Plastic | 1.544 | 55.9 | 4.53 |
| 7 | | -1.298270 (ASP) | 0.050 | | | | |
| 8 | Lens 4 | 2.585070 (ASP) | 0.431 | Plastic | 1.544 | 55.9 | -2.74 |
| 9 | | 0.889490 (ASP) | 0.129 | | | | |
| 10 | Lens 5 | 0.722310 (ASP) | 0.400 | Plastic | 1.530 | 55.8 | 3.86 |
| 11 | | 0.902490 (ASP) | 0.900 | | | | |
| 12 | IR-filter | Plano | 0.300 | Glass | 1.517 | 64.2 | - |
| 13 | | Plano | 0.306 | | | | |
| 14 | Image | Plano | - | | | | |

Note: Reference wavelength is d-line 587.6nm. ASP stands for aspherical surfaces.

FIG. 21

Table 14
Aspheric Coefficients

| Surface # | 2 | 3 | 4 | 5 | 6 |
|---|---|---|---|---|---|
| k = | -1.51007E+00 | -1.00000E+00 | 7.40283E-02 | -1.00000E+00 | -1.92713E+01 |
| A4 = | 6.40303E-03 | -8.34317E-02 | -6.70901E-02 | 5.80137E-02 | -8.89734E-02 |
| A6 = | 6.07691E-02 | -3.21452E-01 | -1.21825E-01 | -9.00015E-02 | 1.16839E-01 |
| A8 = | -3.29901E-01 | 3.80303E-01 | -1.79910E-01 | 5.54066E-02 | -1.01675E-01 |
| A10 = | 2.17362E-01 | -3.87954E-01 | 2.11497E-01 | 6.98863E-02 | 3.54675E-02 |
| A12 = | -4.64205E-02 | -2.49251E-01 | 3.12213E-01 | -2.55481E-02 | -1.54306E-02 |
| A14 = | -1.09998E-01 | -3.38195E-01 | 2.08950E-01 | 7.54533E-03 | 5.47428E-03 |
| A16= | -2.50683E-01 | 1.15832E+00 | -1.75829E-01 | 1.56228E-02 | -2.90382E-03 |

| Surface # | 7 | 8 | 9 | 10 | 11 |
|---|---|---|---|---|---|
| k = | -1.74886E+00 | -3.53820E+01 | -1.14064E+01 | -6.08628E+00 | -4.70782E+00 |
| A4 = | -1.65809E-02 | -2.77288E-02 | -1.36139E-02 | -3.40811E-02 | -3.53971E-02 |
| A6 = | 3.86260E-02 | 1.29809E-02 | 7.63437E-04 | 1.15367E-03 | 6.93163E-04 |
| A8 = | -7.80137E-03 | -2.57319E-03 | -6.88541E-04 | 1.62083E-04 | 2.18220E-04 |
| A10 = | 6.28053E-03 | 2.59591E-04 | 1.16751E-04 | 6.73717E-06 | 1.67596E-05 |
| A12 = | -3.38567E-03 | 9.56035E-06 | 5.25802E-06 | -2.71933E-07 | -2.01162E-06 |
| A14 = | -1.61460E-03 | -5.49222E-06 | -5.22291E-07 | | |
| A16= | 8.89139E-04 | 3.54878E-07 | -1.42333E-07 | | |

FIG. 22

Table 15
(Embodiment 8)
f=3.72 mm, Fno = 2.60, HFOV = 37.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | -0.093 | | | | |
| 2 | Lens 1 | 1.678730 (ASP) | 0.555 | Plastic | 1.544 | 55.9 | 3.65 |
| 3 | | 9.607600 (ASP) | 0.363 | | | | |
| 4 | Lens 2 | -3.167000 (ASP) | 0.300 | Plastic | 1.634 | 23.8 | -8.38 |
| 5 | | -8.123500 (ASP) | 0.531 | | | | |
| 6 | Lens 3 | -2.030590 (ASP) | 0.675 | Plastic | 1.544 | 55.9 | 4.50 |
| 7 | | -1.239590 (ASP) | 0.050 | | | | |
| 8 | Lens 4 | 2.283980 (ASP) | 0.400 | Plastic | 1.634 | 23.8 | -5.76 |
| 9 | | 1.309310 (ASP) | 0.211 | | | | |
| 10 | Lens 5 | 1.187430 (ASP) | 0.516 | Plastic | 1.544 | 55.9 | 22.41 |
| 11 | | 1.114060 (ASP) | 0.900 | | | | |
| 12 | IR-filter | Plano | 0.300 | Glass | 1.517 | 64.2 | - |
| 13 | | Plano | 0.201 | | | | |
| 14 | Image | Plano | - | | | | |

Note: Reference wavelength is d-line 587.6nm. ASP stands for aspherical surfaces.

FIG. 23

Table 16
Aspheric Coefficients

| Surface # | 2 | 3 | 4 | 5 | 6 |
|---|---|---|---|---|---|
| k = | -9.05439E-01 | -1.00000E+00 | -1.28119E+00 | -1.00000E+00 | -1.55390E+01 |
| A4 = | 2.03514E-02 | -3.41708E-02 | -6.06585E-02 | 5.20341E-02 | -8.84198E-02 |
| A6 = | 5.25521E-02 | -1.33438E-01 | -1.49893E-01 | -7.71461E-02 | 1.20155E-01 |
| A8 = | -2.33658E-01 | 9.59704E-02 | -5.27757E-02 | 9.19890E-03 | -9.12820E-02 |
| A10 = | 3.48286E-01 | -1.36516E-01 | 6.02399E-02 | 3.82271E-02 | 3.98309E-02 |
| A12 = | -6.39776E-02 | -1.78690E-01 | -1.19792E-01 | -6.35248E-03 | -1.68145E-02 |
| A14 = | -6.00025E-01 | 2.50831E-01 | 3.94203E-01 | 3.83984E-02 | 3.87908E-03 |
| A16= | 5.13628E-01 | -1.76671E-02 | -1.52085E-01 | -1.74667E-02 | -7.01956E-04 |

| Surface # | 7 | 8 | 9 | 10 | 11 |
|---|---|---|---|---|---|
| k = | -1.87400E+00 | -2.35387E+01 | -1.44104E+01 | -1.07962E+01 | -5.56066E+00 |
| A4 = | -3.60744E-02 | -2.04214E-02 | -6.83353E-03 | -2.26867E-02 | -2.35429E-02 |
| A6 = | 2.24402E-02 | 9.07293E-03 | 1.21884E-03 | 2.54969E-03 | 1.07184E-03 |
| A8 = | -5.89651E-03 | -2.57898E-03 | -7.51802E-04 | 1.31989E-04 | 3.05316E-05 |
| A10 = | 9.53005E-04 | 3.10030E-04 | 1.06208E-04 | -1.04056E-05 | 3.41977E-05 |
| A12 = | -2.29099E-03 | 1.54612E-05 | 4.80211E-06 | -9.22379E-07 | -3.73891E-06 |
| A14 = | -1.73835E-03 | -5.76758E-06 | -4.04328E-07 | | |
| A16= | 5.01988E-04 | 1.25893E-07 | -1.11902E-07 | | |

FIG. 24

Table 17

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f | 4.07 | 3.93 | 3.63 | 3.81 | 3.95 | 3.73 | 3.68 | 3.72 |
| Fno | 2.60 | 2.40 | 2.50 | 2.50 | 2.80 | 2.50 | 2.70 | 2.60 |
| HFOV | 34.6 | 35.5 | 37.7 | 36.4 | 35.7 | 36.9 | 37.5 | 37.2 |
| V1-V2 | 32.5 | 32.1 | 32.1 | 32.1 | 32.5 | 32.1 | 32.1 | 32.1 |
| V1-V2-V4 | -23.3 | -23.8 | 8.3 | 8.3 | -23.3 | -23.8 | -23.8 | 8.3 |
| (R3+R4)/(R3-R4) | -1.47 | -1.90 | -1.59 | -1.47 | -1.30 | -2.48 | -2.32 | -2.28 |
| R1/f | 0.41 | 0.46 | 0.52 | 0.65 | 0.48 | 0.45 | 0.47 | 0.45 |
| R8/f | 0.42 | 0.64 | 0.48 | 0.56 | 0.21 | 0.42 | 0.24 | 0.35 |
| |R2-R3|/f | 2.11 | 5.28 | 7.77 | 0.45 | 2.60 | 3.21 | 11.15 | 3.43 |
| T12/T23 | 0.22 | 0.29 | 0.54 | 0.13 | 0.37 | 0.72 | 0.49 | 0.68 |
| Dr1s/Dr1r4 | 0.50 | 0.49 | 0.46 | 0.46 | 0.44 | 0.52 | 0.09 | 0.08 |
| |f/f3|+|f/f4|+|f/f5| | 1.57 | 1.31 | 1.72 | 2.00 | 3.86 | 2.03 | 3.11 | 1.64 |
| TTL/ImgH | 1.75 | 1.79 | 1.75 | 1.78 | 1.73 | 1.75 | 1.64 | 1.72 |

FIG. 25

IMAGE PICKUP OPTICAL SYSTEM

BACKGROUND OF THE INVENTION

1. Field of the Invention

The present invention relates to an image pickup optical system, and more particularly to a low-cost optical lens assembly that is comprised of five lens elements that constitute the total length of the optical lens assembly and applied to an electronic product.

2. Description of the Related Art

As science and technology advance, the development of electronic products such as mini or thin digital still cameras, web cameras or mobile phone cameras tends to have a compact design to meet the user requirements for an optical lens assembly with good aberration correction ability, high resolution, and high image quality.

In general, a conventional optical lens assembly of a mini electronic product comes with different designs, including the two-lens, three-lens, four-lens, and five-or-more lens designs. If the image quality is taken into consideration, the optical lens assemblies with the four-lens and five-lens designs have advantages on aberration correction and modulation transfer function (MTF), and the five-lens design having a higher resolution than the four-lens design is applicable for electronic products of high video quality or high pixel requirement.

In various mini five-lens designs of an image pickup optical system with a fixed focal length, different combinations of positive and negative refractive powers are adopted. As disclosed in Japanese Pat. Publication Nos. JP2003-131136 and JP2005-266771, two sets of cemented doublets are used for reducing the total length of the optical system. As disclosed in Japanese Pat. Publication Nos. JP2003-185917 and JP2006-293042, U.S. Pat. Publication Nos. US2004/0196571 and US2003/0117722, and R.O.C. Pat. No. TW M313781, one set of cemented doublet is used to achieve a wide-angle effect. As disclosed in Japanese Pat. Publication No. JP2003-161879, a fourth-lens and a fifth-lens with different refractive powers are used to construct an optical system, but the total length of such optical system is not applicable for compact electronic devices.

In small products such as a digital camera, web camera, and mobile phone camera, the optical lens assembly requires a compact design, a short focal length and a good aberration correction. For different designs of the image pickup optical systems with a fixed focal length and five lens elements, a better aberration correction and an appropriate total length can be achieved by designing the fourth and fifth lens elements with different refractive powers and an inflection point. As disclosed in R.O.C. Pat. Nos. TWM313246, TW201038966, TW201022714 and TWM332199 and U.S. Pat. No. 7,710,665, a good aberration correction is achieved, but the total length of the optical system still cannot meet the requirements of compact electronic devices. As disclosed in U.S. Pat. No. 7,826,151, US2010/0254029 and US2010/0253829, the fourth lens element and the fifth lens element having an inflection point are adopted for the design of the optical system with a shorter total length, but these patents use the fourth lens element and the fifth lens element having the inflection point to correct the aberration or image distortion, and thus a longer air gap exists between the third lens element and the fourth lens element which is not desirable for a shorter total length design. Therefore, the present invention provides a feasible design to shorten the optical lens assembly, while using the refractive power of the five lens elements and the combination of convex and concave surfaces to improve the image quality for the application on compact electronic devices, in addition to the effect of reducing the total length of the optical lens assembly.

SUMMARY OF THE INVENTION

Therefore, it is a primary objective of the invention to provide an image pickup optical system comprising the first lens element, the second lens element, the third lens element, the fourth lens element and the fifth lens element sequentially arranged from an object side to an image side, wherein the first lens element with positive refractive power has a convex object-side surface; the second lens element with negative refractive power has a concave object-side surface and a convex image-side surface; the third lens element has refractive power; the fourth lens element with refractive power has a concave image-side surface, and at least one of an object-side surface and the image-side surface is aspheric; and the fifth lens element with refractive power has a concave image-side surface, and at least one of an object-side surface and the image-side surface is aspheric, and at least one of the object-side surface and the image-side surface of the fifth lens element has at least one inflection point. The image pickup optical system further comprises a stop, which can be an aperture stop, and an image sensor at a position of an image plane after the first lens element, the second lens element, the third lens element, the fourth lens element and the fifth lens element are assembled for imaging an object, and the image pickup optical system satisfies the following equations:

$$-4.5 < (R_3 + R_4)/(R_3 - R_4) < -1.0; \text{and} \tag{1}$$

$$0.25 < D_{R1S}/D_{R1R4} < 1.2 \tag{2}$$

Wherein, $R_3$ is the curvature radius of the object-side surface of the second lens element, $R_4$ is the curvature radius of the image-side surface of the second lens element, $D_{R1S}$ is the axial distance from the object-side surface of the first lens element to the stop, and $D_{R1R4}$ is the axial distance from the object-side surface of the first lens element to the image-side surface of the second lens element.

The image pickup optical system as described above further comprises an image sensor at an image plane for imaging an object, and satisfies the following equations, in addition to Equations (1) and (2):

$$TTL/ImgH < 2.0 \tag{3}$$

Wherein, TTL is the axial distance from the object-side surface of the first lens element to the image plane, and an image sensor is installed at the image plane, and ImgH is a half of the diagonal length of an effective photosensitive area of the image sensor.

The present invention further provides an image pickup optical system, sequentially arranged from an object side to an image side, comprising: the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element with positive refractive power has a concave object-side surface and a convex image-side surface; the fourth lens element with negative refractive power, being made of a plastic material, and having a concave image-side surface and at least one of an object-side surface and the image-side surface being aspheric, and the image-side surface having at least one inflection point; and the fifth lens element with refractive power, being made of a plastic material, and having a convex object-side surface and a concave image-side surface, and at least one of the object-side surface and the image-side surface being aspheric, and the object-side surface or the image-side surface having at least one inflection point. The image pickup optical system further comprises a stop and an image sensor, wherein the image sensor at a position of an image plane after the first lens element, the second lens element, the third lens element, the fourth lens element and the fifth lens element are assembled for imaging an object. For the purpose of different applications, the image pickup optical system satisfies one or a combination of the following equations, in addition to Equations (1), (2) and (3):

$$-4.5 < (R_3+R_4)/(R_3-R_4) < -1.0, \text{or} \quad (1)$$

$$\text{Preferably } -3.0 < (R_3+R_4)/(R_3-R_4) < -1.0; \quad (4)$$

$$28 < v_1-v_2 < 45; \quad (5)$$

$$|R_2-R_3|/f > 1.0; \quad (6)$$

$$0.35 < R_1/f < 0.50; \text{and} \quad (7)$$

$$1.20 < |f/f_3| + |f/f_4| + |f/f_5| < 2.70 \quad (8)$$

wherein, $R_3$ is the curvature radius of the object-side surface of the second lens element, $R_4$ is the curvature radius of the image-side surface of the second lens element; $v_1$ is the Abbe number of the first lens element, $v_2$ is the Abbe number of the second lens element, $R_1$ is the curvature radius of the object-side surface of the first lens element, $R_2$ is the curvature radius of the image-side surface of the first lens element, $R_3$ is the curvature radius of the object-side surface of the second lens element, f is the focal length of the image pickup optical system, $f_3$ is the focal length of the third lens element, $f_4$ is the focal length of the fourth lens element, and $f_5$ is the focal length of the fifth lens element.

The present further provides an image pickup optical system, sequentially from an object side to an image side, comprising the first lens element, the second lens element, the third lens element, the fourth lens element and the fifth lens element, wherein the first lens element with positive refractive power has a convex object-side surface; the second lens element with negative refractive power has a concave object-side surface and a convex image-side surface; the third lens element with positive refractive power has a concave object-side surface and a convex image-side surface; the fourth lens element with negative refractive power, being made of a plastic material, and having a concave image-side surface and at least one of an object-side surface and the image-side surface being aspheric, and the image-side surface having at least one inflection point; and the fifth lens element with refractive power, being made of a plastic material, and having a concave image-side surface, and at least one of an object-side surface and the image-side surface being aspheric, and at least one of the object-side surface and the image-side surface having at least one inflection point. The image pickup optical system further comprises a stop and an image sensor at a position of an image plane after the first lens element, the second lens element, the third lens element, the fourth lens element and the fifth lens element are assembled for imaging an object. For the purpose of different applications, the image pickup optical system satisfies one or a combination of the following equations, in addition to Equations (1) and (2):

$$-10 < v_1-v_2-v_4 < 20; \quad (9)$$

$$0.05 < T_{12}/T_{23} < 0.82; \quad (10)$$

$$-4.5 < (R_3+R_4)/(R_3-R_4) < -1.0, \text{or} \quad (1)$$

$$\text{Preferably}, -2.3 < (R_3+R_4)/(R_3-R_4) < -1.0 \quad (11)$$

wherein, $v_1$ is the Abbe number of the first lens element, $v_2$ is the Abbe number of the second lens element, $v_4$ is the Abbe number of the fourth lens element, $T_{12}$ is the axial distance between the first lens element and the second lens element, $T_{23}$ is the axial distance between the second lens element and the third lens element, $R_3$ is the curvature radius of the object-side surface of the second lens element, and $R_4$ is the curvature radius of the image-side surface of the second lens element.

Another objective of the present invention is to provide an image pickup optical system, sequentially from an object side to an image side, comprising: the first lens element, the second lens element, the third lens element, the fourth lens element and the fifth lens element; wherein the first lens element with positive refractive power has a convex object-side surface; the second lens element with negative refractive power has a concave object-side surface and a convex image-side surface; the third lens element with refractive power has a concave object-side surface and a convex image-side surface; the fourth lens element with refractive power has a concave image-side surface and at least one of an object-side surface and the image-side surface being aspheric; and the fifth lens element with refractive power has a concave image-side surface, and at least one of an object-side surface and the image-side surface being aspheric, and at least one of the object-side surface and the image-side surface has at least one inflection point. The image pickup optical system further comprises a stop; and an image sensor for imaging an object, and the image sensor at a position of an image plane after the first lens element, the second lens element, the third lens element, the fourth lens element and the fifth lens element are assembled. The image pickup optical system satisfies the following equations:

$$-4.5 < (R_3+R_4)/(R_3-R_4) < -1.0; \text{and} \quad (1)$$

$$0.05 < T_{12}/T_{23} < 0.82 \quad (10)$$

Wherein, $R_3$ is the curvature radius of the object-side surface of the second lens element, $R_4$ is the curvature radius of the image-side surface of the second lens element, $T_{12}$ is the axial distance between the first lens element and the second lens element, and $T_{23}$ is the axial distance between the second lens element and the third lens element.

On the other hand, the image pickup optical system as described above further comprises an image sensor at a position of an image plane for imaging an object, and satisfies the following equations in addition to Equations (1) and (10):

$$TTL/ImgH < 2.0 \quad (3)$$

Wherein, TTL is the axial distance from the object-side surface of the first lens element to the image plane, and an image sensor is installed at the image plane, and ImgH is a half of the diagonal length of an effective photosensitive area of the image sensor.

The present invention provides an image pickup optical system, sequentially from an object side to an image side, comprising: the first lens element, the second lens element, the third lens element, the fourth lens element and the fifth lens element; wherein the first lens element with positive refractive power has a convex object-side surface; the second lens element with negative refractive power has a concave object-side surface and a convex image-side surface; the third lens element with positive refractive power has a concave object-side surface and a convex image-side surface; the fourth lens element with negative refractive power has a concave image-side surface, and at least one of an object-side surface and the image-side surface being aspheric; and the fifth lens element with refractive power, being made of a plastic material, and having a convex object-side surface and a concave image-side surface, and at least one of the object-side surface and the image-side surface being aspheric, and at least one of the object-side surface and image-side surface having at least one inflection point. The image pickup optical system further comprises a stop and an image sensor at a position of an image plane after the first lens element, the second lens element, the third lens element, the fourth lens element and the fifth lens element are assembled for imaging an object. For the purpose of different applications, the image pickup optical system satisfies one or a combination of the following equations, in addition to Equations (1), (10) and (3):

$$-3.0 < (R_3+R_4)/(R_3-R_4) < -1.0, \text{or} \quad (4)$$

$$\text{Preferably}, -2.3 < (R_3+R_4)/(R_3-R_4) < -1.0; \quad (12)$$

$$|R_2-R_3|/f > 1.0; \quad (6)$$

$$1.20 < |f/f_3| + |f/f_4| + |f/f_5| < 2.70; \quad (8)$$

$$28 < v_1 - v_2 < 45; \text{and} \quad (5)$$

$$0 < R_8/f < 0.9; \quad (13)$$

Wherein, $T_{12}$ is the axial distance between the first lens element and the second lens element, $T_{23}$ is the axial distance between the second lens element and the third lens element, f is the focal length of the image pickup optical system, $f_3$ is the focal length of the third lens element, $f_4$ is the focal length of the fourth lens element, $f_5$ is the focal length of the fifth lens element, $v_1$ is the Abbe number of the first lens element, $v_2$ is the Abbe number of the second lens element, and $R_8$ is the curvature radius of the image-side surface of the fourth lens element.

With appropriate arrangements of each lens element among the first lens element, second lens element, third lens element, fourth lens element and fifth lens element of the present invention, the total length of the optical lens assembly can be shortened while good aberration corrections and modulation transfer function (MTF) can be achieved effectively.

In the image pickup optical system of the present invention, the first lens element comes with positive refractive power for providing the partial refractive power required by the combination of the first lens element and second lens element to reduce the total length of the combination of the two lens elements, and the second lens element with negative refractive power is able to effectively correct any aberration produced by the first lens element with positive refractive power and to correct the Petzval sum of the system, such that the image at the periphery becomes flatter, while favoring the correction of the chromatic aberration of the system. Similarly, within the combination of the third lens element and the fourth lens element, the third lens element with positive refractive power can provide the partial refractive power required by the combination of the third lens element and the fourth lens element to reduce the total length of the third lens element and the fourth lens element combination, and the fourth lens element with negative refractive power can correct the aberration produced by the third lens element with positive refractive power effectively and to correct the chromatic aberration of the system. By using the fifth lens element to correct the aberration and chromatic aberration in the images produced by the combination of the third lens element and the fourth lens element and through the representation of the modulation transfer function, the overall resolution of the image pickup optical system can be improved, so that the aberration and distortion corrections of the image pickup optical system can meet the high resolution requirement.

In the image pickup optical system of the present invention, both the combination of the first lens element with positive refractive power and the second lens element with negative refractive power and the combination of the third lens element with positive refractive power and the fourth lens element with negative refractive power have similar refractive power arrangement. With the refractive power compensation of the fifth lens element, the total length of the image pickup optical system can be reduced effectively, such that a larger effective photosensitive area of the image sensor can be achieved with the same total length. In other words, a shorter image pickup optical system can be designed with the same effective photosensitive area of the image sensor.

In the image pickup optical system of the present invention, the first lens element and the third lens element can increase the refractive power effective to shorten the total length of the image pickup optical system, and the combination of the concave image-side surface of the fourth lens element and the convex object-side surface of the fifth lens element can extend the back focal length of the optical lens assembly effectively and increase the effective photosensitive area of the image sensor to assure that the light entering into the image pickup optical system can be received within the effective photosensitive range of the image sensor. In addition, the fourth lens element and the fifth lens element can be made of a plastic material to favor the manufacture and lower the cost.

BRIEF DESCRIPTION OF THE DRAWINGS

FIG. 9 shows Table 1 that lists optical data of the first preferred embodiment of the present invention;

FIG. 10 shows Table 2 that lists aspherical surface data of the first preferred embodiment of the present invention;

FIG. 11 shows Table 3 that lists optical data of the second preferred embodiment of the present invention;

FIG. 12 shows Table 4 that lists aspherical surface data of the second preferred embodiment of the present invention;

FIG. 13 shows Table 5 that lists optical data of the third preferred embodiment of the present invention;

FIG. 14 shows Table 6 that lists aspherical surface data of the third preferred embodiment of the present invention;

FIG. 15 shows Table 7 that lists optical data of the fourth preferred embodiment of the present invention;

FIG. 16 shows Table 8 that lists aspherical surface data of the fourth preferred embodiment of the present invention;

FIG. 17 shows Table 9 that lists optical data of the fifth preferred embodiment of the present invention;

FIG. 18 shows Table 10 that lists aspherical surface data of the fifth preferred embodiment of the present invention;

FIG. 19 shows Table 11 that lists optical data of the sixth preferred embodiment of the present invention;

FIG. 20 shows Table 12 that lists aspherical surface data of the sixth preferred embodiment of the present invention;

FIG. 21 shows Table 13 that lists optical data of the seventh preferred embodiment of the present invention;

FIG. 22 shows Table 14 that lists aspherical surface data of the seventh preferred embodiment of the present invention;

FIG. 23 shows Table 15 that lists optical data of the eighth preferred embodiment of the present invention;

FIG. 24 shows Table 16 that lists aspherical surface data of the eighth preferred embodiment of the present invention; and FIG. 25 shows Table 17 that lists the data of the respective embodiments.

DETAILED DESCRIPTION OF THE PREFERRED EMBODIMENTS

Figure 1A:
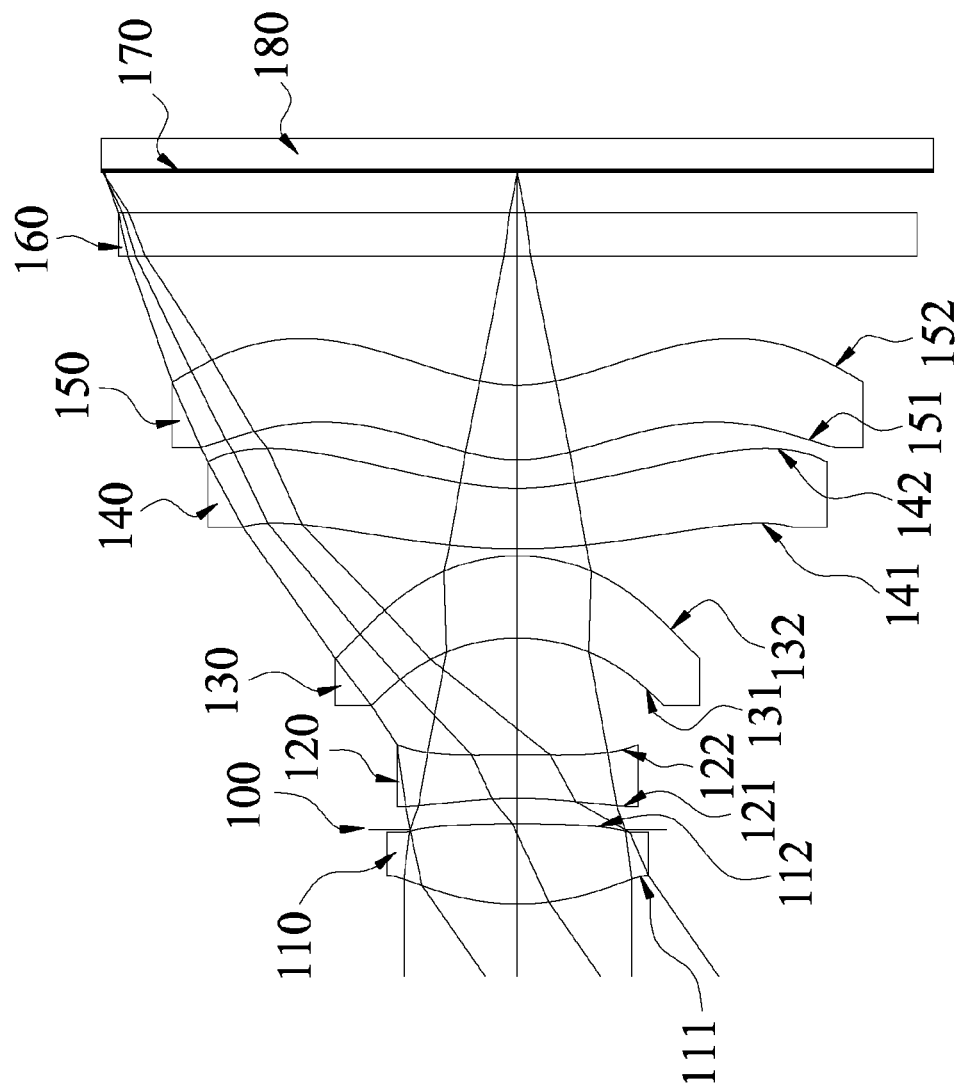
FIG. 1A is a schematic view of an optical system in accordance with the first preferred embodiment of the present invention.

With reference to FIG. 1A for an image pickup optical system of the present invention, the image pickup optical system, sequentially arranged from an object side to an image side along an optical axis, comprises: the first lens element (110), the second lens element (120), the third lens element (130), the fourth lens element (140) and the fifth lens element (150); wherein the first lens element (110) with positive refractive power has a convex object-side surface (111) and a convex image-side surface (112), and the object-side surface (111) and the image-side surface (112) can be aspheric or spheric; the second lens element (120) with negative refractive power has a concave object-side surface (121) and a convex image-side surface (122), and the object-side surface (121) and the image-side surface (122) can be aspheric or spheric; the third lens element (130) with positive refractive power has a concave object-side surface (131) and a convex image-side surface (132), and the object-side surface (131) and the image-side surface (132) can be aspheric or spheric; the fourth lens element (140) with negative refractive power has a convex object-side surface (141) proximate to the optical axis and a concave image-side surface (142) proximate to the optical axis, and the image-side surface (142) of the fourth lens element has at least one inflection point; and the fifth lens element (150) with positive refractive power has a convex object-side surface (151) proximate to the optical axis, and a concave image-side surface (152) proximate to the optical axis, and both optical surfaces of the fifth lens element have at least one inflection point. The image pickup optical system further comprises an aperture stop (100) and an infrared filter (160), and the aperture stop (100) is installed between the first lens element (110) and the second lens element (120); the infrared filter (160) is installed between the fifth lens element (150) and the image plane (170) and is generally made of a plate optical material without affecting the overall focal length of the image pickup optical system of present invention. The image pickup optical system further comprises an image sensor (180) installed on the image plane (170) for imaging an object. The first lens element (110), second lens element (120), third lens element (130), fourth lens element (140) and fifth lens element (150) come with aspherical optical surfaces in compliance with the aspherical surface formula as given in Equation (14):

$$X(Y) = \frac{(Y^2/R)}{1+\sqrt{(1-(1+K)(Y/R)^2)}} + \sum_i (A_i) \cdot (Y^i) \quad (14)$$

Wherein, X is the relative height from a point on the aspherical surface with a distance Y from the optical axis to a tangent plane at the tip of the optical axis of the aspherical surface;

Y is the distance between a point on the curve of the aspherical surface and the optical axis;

K is the conic coefficient; and $A_i$ is the $i^{th}$ level aspherical surface coefficient.

With the installation of the aforementioned first lens element (110), second lens element (120), third lens element (130), fourth lens element (140), fifth lens element (150), aperture stop (100) and image sensor (180), the image pickup optical system of the present invention satisfies Equations (1) and (2). If the curvature radius $R_3$ of the object-side surface (121) of the second lens element (120) and the curvature radius $R_4$ of the image-side surface (122) of the second lens element (120) are limited to the condition of Equation (1), then the change of surface shapes of the object-side surface (121) and the image-side surface (122) of the second lens element (120) can be limited, not only favoring the aberration correction of the second lens element (120) only, but also improving the image quality of the second lens element (120), and making the manufacture of the second lens element (120) easier. If Equation (2) is satisfied wherein the axial distance from the object-side surface (112) of the first lens element (110) to the aperture stop (100) is $D_{R1S}$ and the axial distance from the object-side surface (112) of the first lens element (110) to the image-side surface (121) of the second lens element (120) is $D_{R1R4}$, then the total length from the first lens element (110) to the second lens element (120) can be shortened. Further, if Equation (3) is satisfied, the total length (TTL) of the image pickup optical system can be reduced effectively, so that a greater effective photosensitive area of the image sensor (ImgH) can be achieved with the same total length (TTL).

If the difference between the Abbe number $v_1$ of the first lens element (110) and the Abbe number $v_2$ of the second lens element (120) is limited by the condition as given in Equation (5), or the difference among the Abbe number $v_1$ of the first lens element (110), the Abbe number $v_2$ of the second lens element (120) and the Abbe number $v_4$ of the fourth lens element (140) is limited by the condition as given in Equation (9), then the range of selecting a material used for the first lens element (110), second lens element (120) and fourth lens element (140) is decreased. If the ratio of the difference between the curvature radius $R_2$ of the image-side surface (112) of the first lens element (110) and the curvature radius $R_3$ of the object-side surface (121) of the second lens element (120) to the focal length f of the image pickup optical system increases, the refractive power ratio of the first lens element (110) with the positive refractive power to the second lens element (120) with the negative refractive power as shown in Equation (6) or Equation (7) increases, such that the light exiting the first lens element (110) exits the second lens element (120) with a greater refractive angle. If the ratio of the distance $T_{12}$ from the image-side surface (112) of the first lens element (110) to the object-side surface (121) of the second lens element (120) on the optical axis to the distance $T_{23}$ from the image-side surface (122) of the second lens element (120) to the object-side surface (131) of the third lens element (130) is limited by the condition as described in Equation (10), so that light passing through the first lens element (110) and an air gap enters into the second lens element (120) within a specific range of refractive angles to increase the refractive angle and reduce the total length. With the limitation of Equation (8), the refractive power required by the third lens element (130), the fourth lens element (140) and the fifth lens element (150) of the image pickup optical system can be allocated effectively to enhance the sensitivity of the image pickup optical system comprised of the third lens element (130), fourth lens element (140) and fifth lens element (150).

Figure 7A:
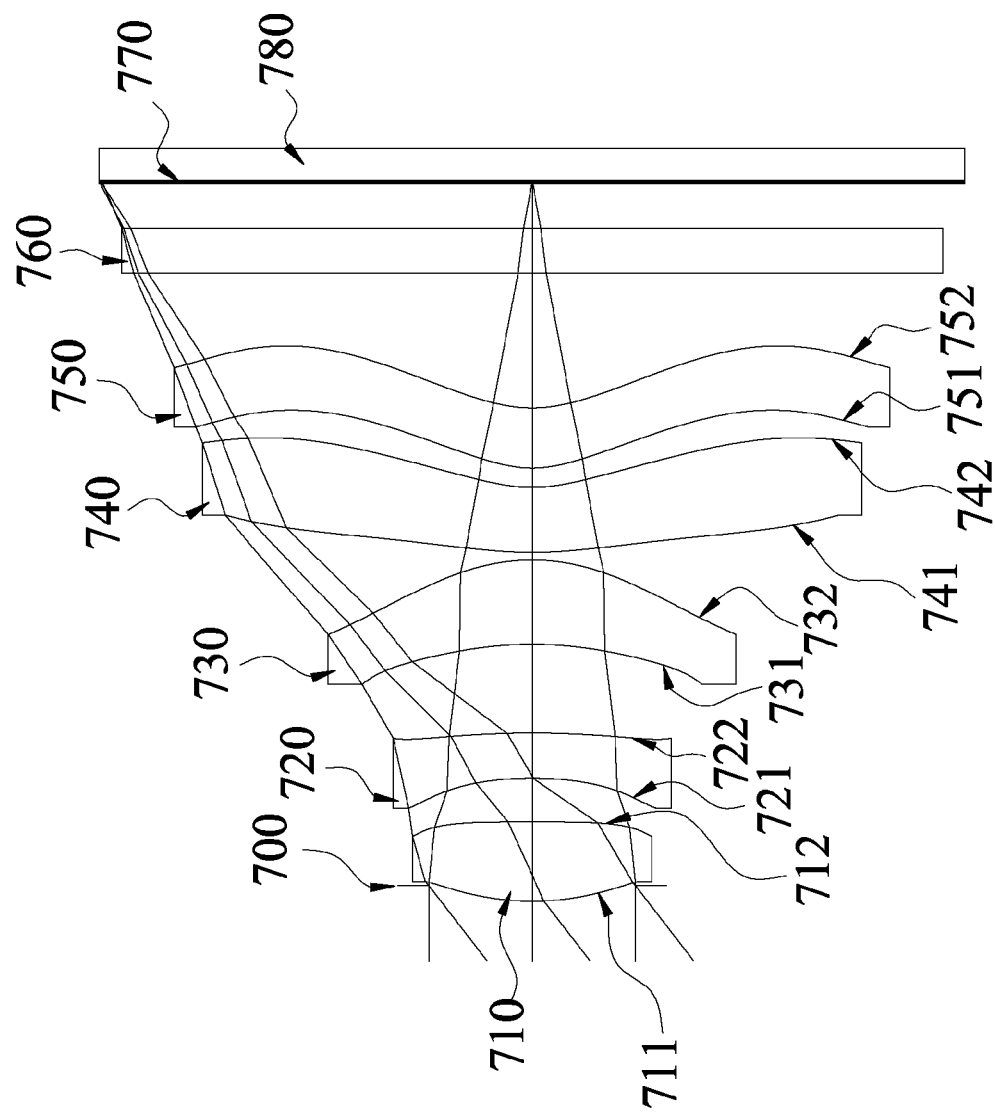
FIG. 7A is a schematic view of an optical system in accordance with the seventh preferred embodiment of the present invention.

In FIG. 7A, the present invention further provides an image pickup optical system, sequentially from an object side to an image side along an optical axis, comprising: the first lens element (710), the second lens element (720), the third lens element (730), the fourth lens element (740) and the fifth lens element (750), wherein the first lens element (710) with positive refractive power has a convex object-side surface (711) and a convex image-side surface (712), and the object-side surface (711) and image-side surface (712) can be aspheric or spheric; the second lens element (720) with negative refractive power has a concave object-side surface (721) and a convex image-side surface (722), and the object-side surface (721) and the image-side surface (722) can be aspheric or spheric; the third lens element (730) with positive refractive power has a concave object-side surface (731) and a convex image-side surface (732), and the object-side surface (731) and the image-side surface (732) can be aspheric or spheric; the fourth lens element (740) with negative refractive power has a convex object-side surface (741) proximate to the optical axis and a concave image-side surface (742) proximate to the optical axis, and the image-side surface (742) has at least one inflection point; and the fifth lens element (750) with positive refractive power has a convex object-side surface (751) proximate to the optical axis and a concave image-side surface (752) proximate to the optical axis, and both optical surfaces (751), (752) of the fifth lens element have at least one inflection point. The image pickup optical system further comprises an aperture stop (700) and an infrared filter (760), and the aperture stop (700) is installed between the first lens element (710) and an object, and the infrared filter (760) is installed between the fifth lens element (750) and the image plane (770) and generally made of a plate optical material without affecting the focal length of the image pickup optical system of the present invention. The infrared filter (760) can include an image sensor (780) installed on the image plane (770) for imaging an object. The aspherical surfaces of the first lens element (710), second lens element (720), third lens element (730), fourth lens element (740) and fifth lens element (750) are designed according to the aspherical surface formula as given in Equation (14).

In the image pickup optical system of the present invention, the aforementioned first lens element (710), second lens element (720), third lens element (730), fourth lens element (740), fifth lens element (750), aperture stop (700) and image sensor (780) satisfy Equations (1) and (2). If the curvature radius $R_3$ of the object-side surface (721) of the second lens element (720) and the curvature radius $R_4$ of the image-side surface (722) of the second lens element (720) are limited by the condition of Equation (1) to limit the surface change of the object-side surface (721) and the image-side surface (722) of the second lens element (720), which favors the aberration correction of the second lens element (720) to assist improving the image quality of the second lens element (720) and make the manufacture of the second lens element (720) easier. If Equation (2) is satisfied, the axial distance $D_{R1S}$ from the object-side surface (710) of the first lens element to the aperture stop (700) and the axial distance $D_{R1R4}$ from the object-side surface (712) of the first lens element (710) to the image-side surface (721) of the second lens element (720) can reduce the total length from the first lens element (710) to the second lens element (720). If Equation (3) is satisfied, the total length (TTL) of the image pickup optical system can be shortened effectively, such that a greater effective photosensitive area of the image sensor (ImgH) can be achieved with the same total length (TTL).

If the difference between the Abbe number $v_1$ of the first lens element (710) and the Abbe number $v_2$ of the second lens element (720) is limited by the condition of Equation (5), the selection of material used for the first lens element (710) and the second lens element (720) is limited. If ratio of the curvature radius $R_8$ of the image-side surface (742) of the fourth lens element to the focal length f of image pickup optical system decreases, the aberration compensation ability of the fourth lens element (740) with negative refractive power increases. The limitation of Equation (8) is used for allocating the refractive power required by the third lens element (730), fourth lens element (740) and fifth lens element (750) of the image pickup optical system effectively to assisting improving the sensitivity of the image pickup optical system comprised of the third lens element (730), the fourth lens element (740) and the fifth lens element (750). If the ratio of the distance $T_{12}$ from the image-side surface (712) of the first lens element (710) to the object-side surface (721) of the second lens element (720) along the optical axis to the distance $T_{23}$ from the image-side surface (722) of the second lens element (720) to the object-side surface (731) of the third lens element (730) are limited as described in Equation (10), such that the light passing through the first lens element (710) and an air gap enters into the second lens element (720) with a specific range of refractive angles to increase the refractive angle and reduce the total length.

The image pickup optical system of the present invention is described in details by preferred embodiments and related drawings as follows.

First Preferred Embodiment

Figure 1B:
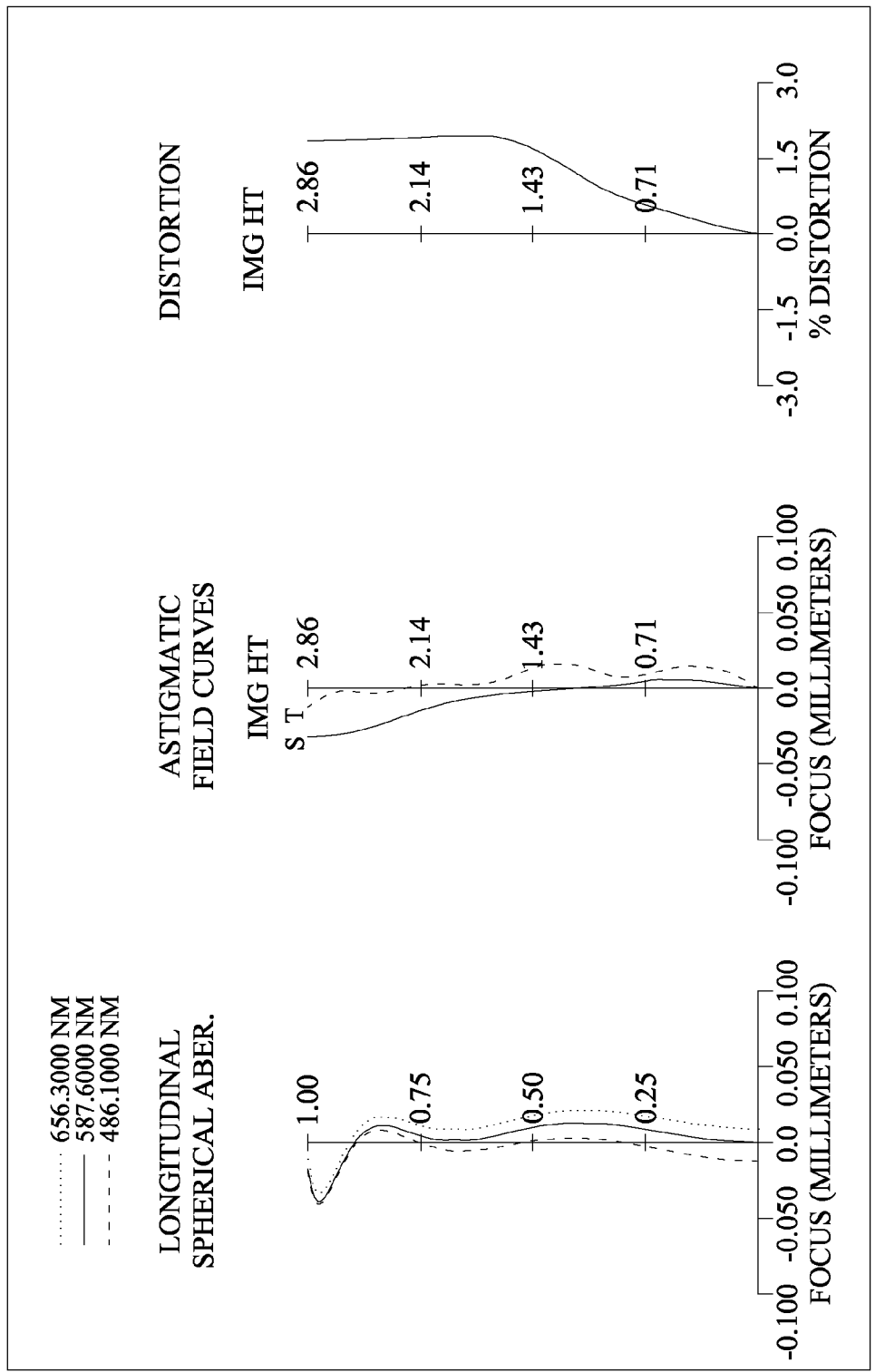
FIG. 1B is a series of aberration curves of the first preferred embodiment of the present invention.

With reference to FIGS. 1A and 1B for a schematic view and a series of aberration curves of an image pickup optical system in accordance with the first preferred embodiment of the present invention respectively, the image pickup optical system comprises five lens elements, an infrared filter (160), an aperture stop (100) and an image sensor (180). The five lens elements, sequentially from an object side to an image side along an optical axis, include: the first lens element (110)

with positive refractive power, which is a bi-convex lens made of a plastic material and having an aspherical object-side surface (111) and an aspherical image-side surface (112); the second lens element (120) with negative refractive power, which is a lens made of a plastic material and having a concave object-side surface (121) proximate to the optical axis and a convex image-side surface (122) proximate to the optical axis, and both object-side surface (121) and image-side surface (122) being aspheric; the third lens element (130) with positive refractive power, which is a lens made of a plastic material and having a concave object-side surface (131) and a convex image-side surface (132), and both object-side surface (131) and image-side surface (132) being aspheric; the fourth lens element (140) with negative refractive power, which is a lens made of a plastic material and having a convex object-side surface (141) proximate to the optical axis and a concave image-side surface (142) proximate to the optical axis, and the object-side surface (141) and the image-side surface (142) being aspheric, and the image-side surface (142) having at least one inflection point; the fifth lens element (150) with positive refractive power, which is a lens made of a plastic material and having a convex object-side surface (151) and a concave image-side surface (152), and the object-side surface (151) and the image-side surface (152) being aspheric, and the object-side surface (151) and the image-side surface (152) having at least one inflection point; an infrared filter (IR-filter) (160) made of a plate glass material without affecting the focal length of the image pickup optical system of the present invention; and an image sensor (180) installed at an image plane (170). In this preferred embodiment, the image pickup optical system further comprises an aperture stop (100) disposed between the first lens element (110) and the second lens element (120).

With reference to FIG. 9 (which shows Table 1) for optical data of this preferred embodiment, the object-side surface (111) and image-side surface (112) of the first lens element (110), the object-side surface (121) and image-side surface (122) of the second lens element (120), the object-side surface (131) and image-side surface (132) of the third lens element (130), the object-side surface (141) and image-side surface (142) of the fourth lens element (140), and the object-side surface (151) and image-side surface (152) of the fifth lens element (150) satisfy the aspherical surface formula as given in Equation (14), and FIG. 10 (which shows Table 2) lists the aspherical surface coefficients.

In the image pickup optical system of the first preferred embodiment, the focal length of the whole image pickup optical system is f=4.07 (mm), the aperture value (f-number) of the whole image pickup optical system is Fno=2.60, and half of the maximum view angle is HFOV=34.6 (degrees).

With reference to Table 1 for this preferred embodiment, if $D_{R1S}$ is the axial distance from the object-side surface (111) of the first lens element (110) to the aperture stop (100), $D_{R1R4}$ is the axial distance from the object-side surface (111) of the first lens element (110) to the image-side surface (122) of the second lens element (120), $R_3$ is the curvature radius near the optical axis of the object-side surface (121) of the second lens element (120) of the image pickup optical system, and $R_4$ is the curvature radius near the optical axis of the image-side surface (122) of the second lens element (120), they satisfy the following equations: $(R_3+R_4)/(R_3-R_4)=-1.47$, and $D_{R1S}/D_{R1R4}=0.50$.

In this preferred embodiment, the image pickup optical system further comprises an aperture stop (100) disposed between the first lens element (110) and the second lens element (120). If TTL is the distance from the object-side surface (111) of the first lens element (110) to the image plane (170) of the image sensor (180) along the optical axis and ImgH is half of the diagonal length of the effective photosensitive area of the image sensor (180) installed at the image plane (170), they satisfy the equation: TTL/ImgH=1.75. Now, in the image pickup optical system of this preferred embodiment, if $v_1$ is the Abbe number of the first lens element (110), $v_2$ is the Abbe number of the second lens element (120), and $v_4$ is the Abbe number of the fourth lens element (140), they satisfy the equations: $v_1-v_2=32.5$, and $v_1-v_2-v_4=-23.3$. If f is the focal length of the whole image pickup optical system, $R_1$ is the curvature radius near the optical axis of the object-side surface (111) of the first lens element (110), $R_2$ is the curvature radius near the optical axis of the image-side surface (112) of the first lens element (110), and $R_3$ is the curvature radius near the optical axis of the object-side surface (121) of the second lens element (120), they satisfy the equations: $|R_2-R_3|/f=2.11$ and $R_1/f=0.41$. If f is the focal length of the whole image pickup optical system and R8 is the curvature radius near the optical axis of the image-side surface (142) of the fourth lens element, they satisfy the equation: $R_8/f=0.42$. If f is the focal length of the whole image pickup optical system, $f_3$ is the focal length of the third lens element (130), $f_4$ is the focal length of the fourth lens element (140), $f_5$ is the focal length of the fifth lens element (150), they satisfy the equation: $|f/f_3|+|f/f_4|+|f/f_5|=1.57$. If $T_{12}$ is the distance from the image-side surface (112) of the first lens element (110) to the object-side surface (121) of the second lens element (120) along the optical axis and $T_{23}$ is the distance from the image-side surface (122) of the second lens element (120) to the object-side surface (131) of the third lens element (130), the ratio of $T_{12}$ to $T_{23}$ satisfies the equation: $T_{12}/T_{23}=0.22$.

From the optical data listed in FIG. 9 (which is Table 1) and the aberration curve as shown in FIG. 1B, good compensation effects of the longitudinal spherical aberration, astigmatic field curving and distortion can be achieved by the image pickup optical system in accordance with this preferred embodiment of the present invention.

Second Preferred Embodiment

Figure 2A:
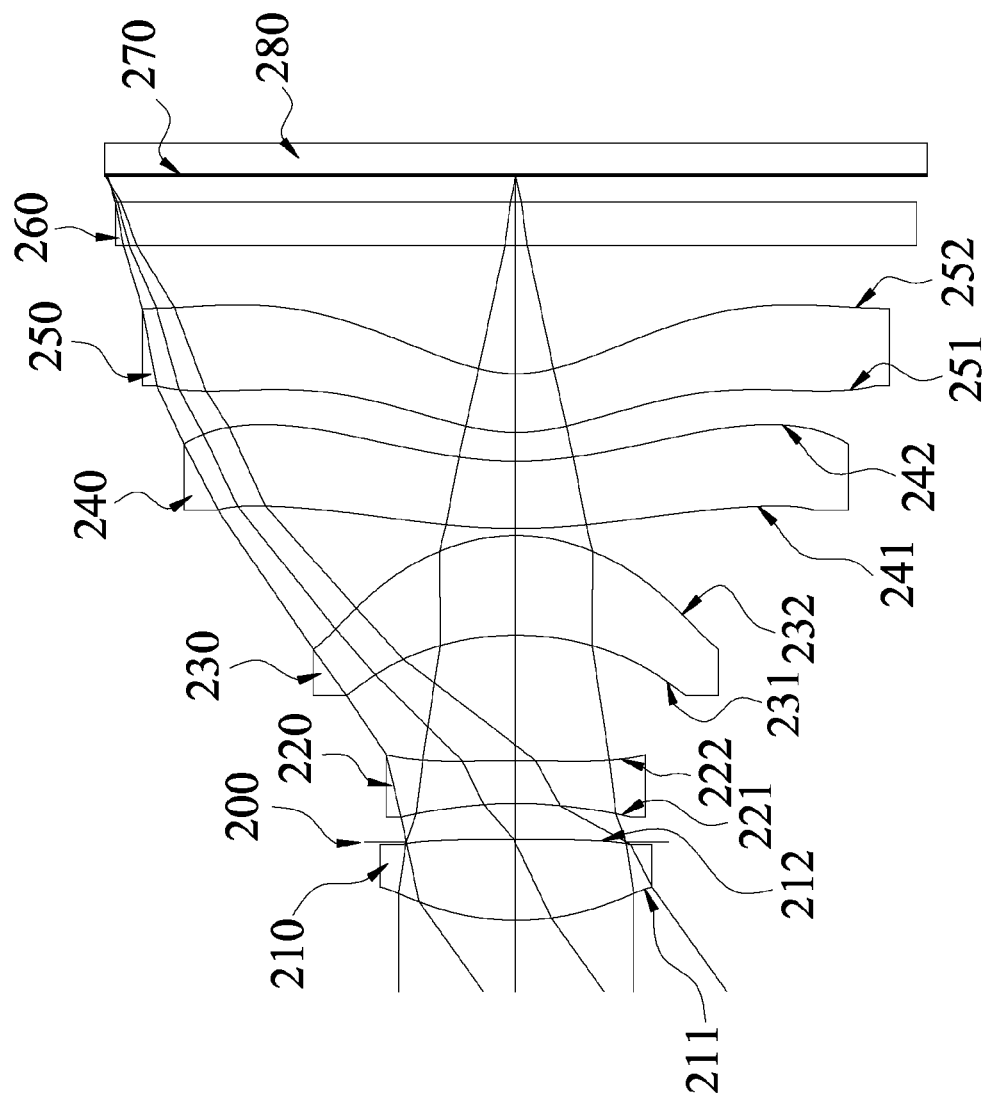
FIG. 2A is a schematic view of an optical system in accordance with the second preferred embodiment of the present invention.
Figure 2B:
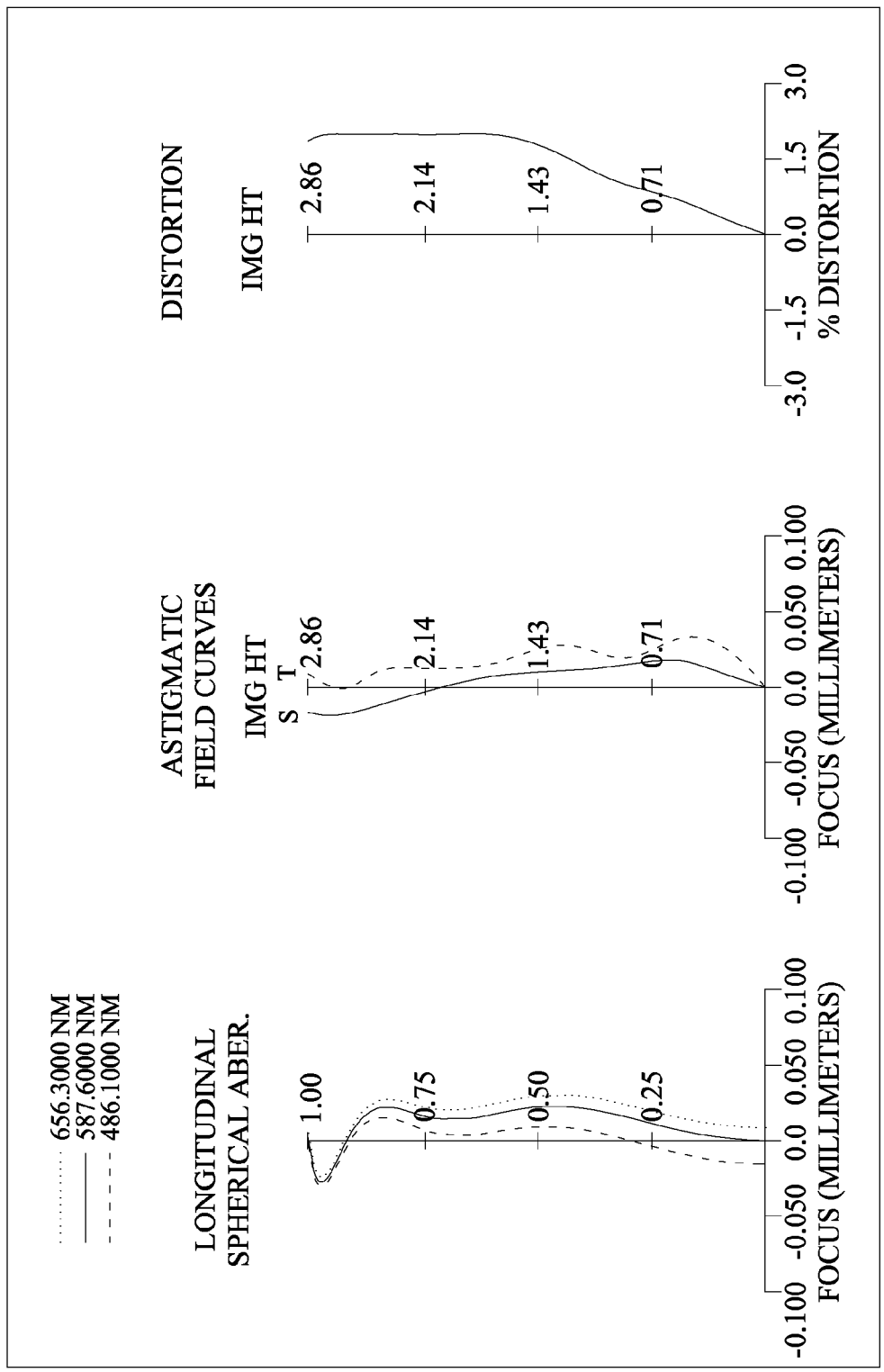
FIG. 2B is a series of aberration curves of the second preferred embodiment of the present invention.

With reference to FIGS. 2A and 2B for a schematic view and a series of aberration curves of an image pickup optical system in accordance with the second preferred embodiment of the present invention respectively, the image pickup optical system comprises five lens elements, an infrared filter (260), an aperture stop (200) and an image sensor (280). The five lens elements, sequentially from an object side to an image side along an optical axis, include: the first lens element (210) with positive refractive power, which is a bi-convex lens made of a plastic material and having an aspherical object-side surface (211) and an aspherical image-side surface (212); the second lens element (220) with negative refractive power, which is a lens made of a plastic material and having a concave object-side surface (221) proximate to the optical axis and a convex image-side surface (222) proximate to the optical axis, and both object-side surface (221) and image-side surface (222) being aspheric; the third lens element (230) with positive refractive power, which is a lens made of a plastic material and having a concave object-side surface (231) and a convex image-side surface (232), and both object-side surface (231) and image-side surface (232) being aspheric; the fourth lens element (240) with negative refractive power, which is a lens made of a plastic material and having a convex object-side surface (241) proximate to the optical axis and a concave image-side surface (242) proximate to the optical axis, and the object-side surface (241) and the image-side surface (242) being aspheric, and the image-side surface (242) having at least one inflection point; the fifth lens element (250) with negative refractive power, which is a lens made of a plastic material and having a convex object-side surface (251) and a concave image-side surface (252), and the object-side surface (251) and the image-side surface (252) being aspheric, and the object-side surface (251) and the image-side surface (252) having at least one inflection point; an infrared filter (IR-filter) (260) made of a plate glass material without affecting the focal length of the image pickup optical system of the present invention; and an image sensor (280) installed at an image plane (270). In this preferred embodiment, the image pickup optical system further comprises an aperture stop (200) disposed between the first lens element (210) and the second lens element (220).

With reference to FIG. 11 (which shows Table 3) for optical data of this preferred embodiment, the object-side surface (211) and image-side surface (212) of the first lens element (210), the object-side surface (221) and image-side surface (222) of the second lens element (220), the object-side surface (231) and image-side surface (232) of the third lens element (230), the object-side surface (241) and image-side surface (242) of the fourth lens element (240), and the object-side surface (251) and image-side surface (252) of the fifth lens element (250) satisfy the aspherical surface formula as given in Equation (14), and FIG. 12 (which shows Table 4) lists the aspherical surface coefficients.

In the image pickup optical system of the second preferred embodiment, the focal length of the whole image pickup optical system is f=3.93 (mm), the aperture value (f-number) of the whole image pickup optical system is Fno=2.40, and half of the maximum view angle is HFOV=35.5 (degrees).

With reference to Table 3 for this preferred embodiment, if $D_{R1S}$ is the axial distance from the object-side surface (211) of the first lens element (210) to the aperture stop (200), $D_{R1R4}$ is the axial distance from the object-side surface (211) of the first lens element (210) to the image-side surface (122) of the second lens element (220), $R_3$ is the curvature radius near the optical axis of the object-side surface (221) of the second lens element (220) of the image pickup optical system, and $R_4$ is the curvature radius near the optical axis of the image-side surface (122) of the second lens element (120), they satisfy the following equations: $(R_3+R_4)/(R_3-R_4)=-1.90$, and $D_{R1S}/D_{R1R4}=0.49$.

In this preferred embodiment, if TTL is the distance from the object-side surface (211) of the first lens element (210) to the image plane (270) of the image sensor (280) along the optical axis and ImgH is half of the diagonal length of the effective photosensitive area of the image sensor (280) installed at the image plane (270), they satisfy the equation: TTL/ImgH=1.79. Now, in the image pickup optical system of this preferred embodiment, if $v_1$ is the Abbe number of the first lens element (210), $v_2$ is the Abbe number of the second lens element (220), and $v_4$ is the Abbe number of the fourth lens element (240), they satisfy the equations: $v_1-v_2=32.1$ and $v_1-v_2-v_4=-23.8$. If f is the focal length of the whole image pickup optical system, $R_1$ is the curvature radius near the optical axis of the object-side surface (211) of the first lens element (210), $R_2$ is the curvature radius near the optical axis of the image-side surface (212) of the first lens element (210), and $R_3$ is the curvature radius near the optical axis of the object-side surface (221) of the second lens element (220), they satisfy the equations: $|R_2-R_3|/f=5.28$ and $R_1/f=0.46$. If f is the focal length of the whole image pickup optical system and $R_8$ is the curvature radius near the optical axis of the image-side surface (242) of the fourth lens element, they satisfy the equation: $R_8/f=0.64$. If f is the focal length of the whole image pickup optical system, $f_3$ is the focal length of the third lens element (230), $f_4$ is the focal length of the fourth lens element (240), $f_5$ is the focal length of the fifth lens element (250), they satisfy the equation: $|f/f_3|+|f/f_4|+|f/f_5|=1.31$. If $T_{12}$ is the distance from the image-side surface (212) of the first lens element (110) to the object-side surface (221) of the second lens element (220) along the optical axis and $T_{23}$ is the distance from the image-side surface (222) of the second lens element (220) to the object-side surface (231) of the third lens element (230), the ratio of $T_{12}$ to $T_{23}$ satisfies the equation: $T_{12}/T_{23}=0.29$.

From the optical data listed in FIG. 11 (which is Table 3) and the aberration curve as shown in FIG. 2B, good compensation effects of the longitudinal spherical aberration, astigmatic field curving and distortion can be achieved by the image pickup optical system in accordance with this preferred embodiment of the present invention.

Third Preferred Embodiment

Figure 3A:
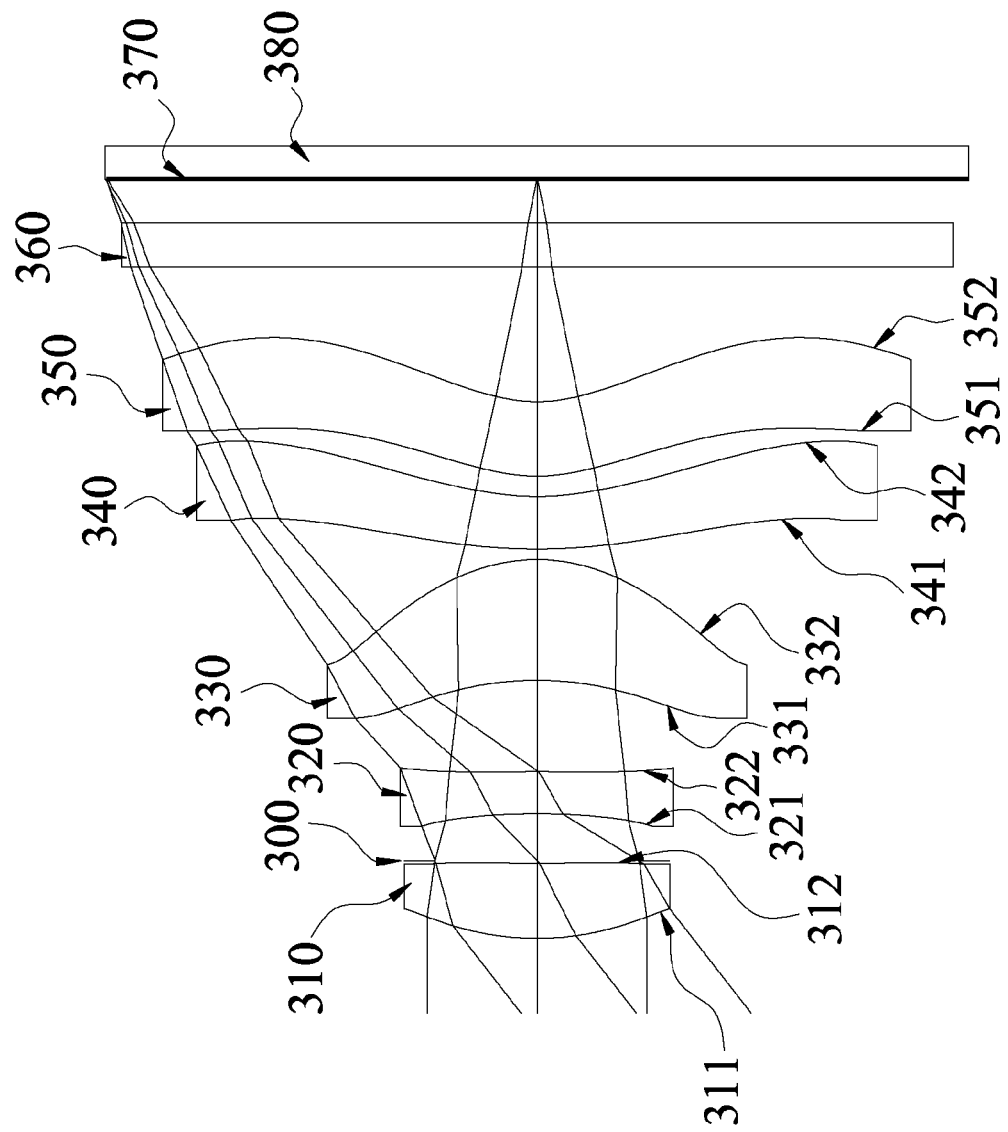
FIG. 3A is a schematic view of an optical system in accordance with the third preferred embodiment of the present invention.
Figure 3B:
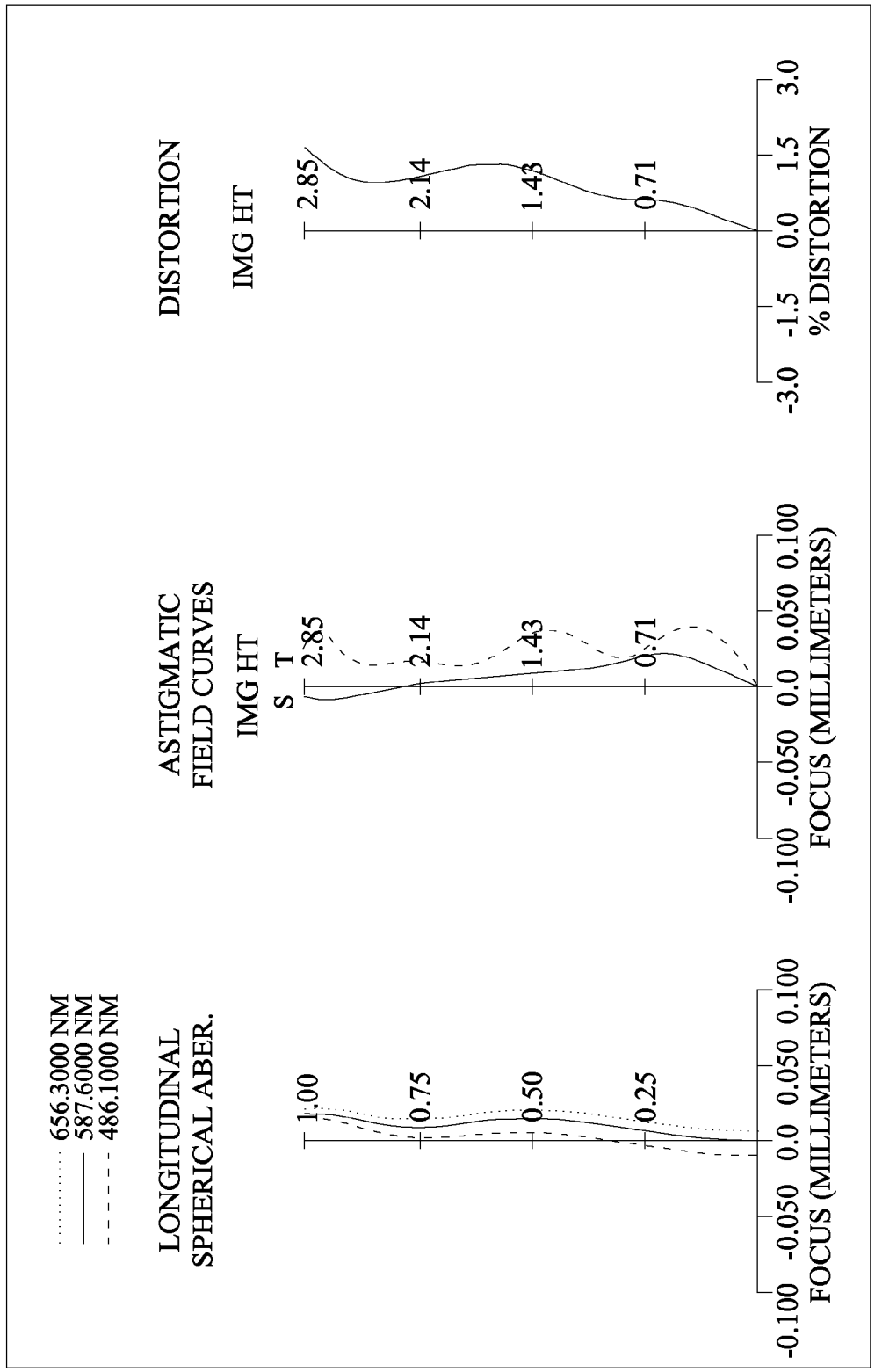
FIG. 3B is a series of aberration curves of the third preferred embodiment of the present invention.

With reference to FIGS. 3A and 3B for a schematic view and a series of aberration curves of an image pickup optical system in accordance with the third preferred embodiment of the present invention respectively, the image pickup optical system comprises five lens elements, an infrared filter (360), an aperture stop (300) and an image sensor (380). The five lens elements, sequentially from an object side to an image side along an optical axis, include: the first lens element (310) with positive refractive power, which is a lens made of a plastic material and having a convex object-side surface (311) and a concave image-side surface (312) proximate to the optical axis, and both object-side surface (311) and image-side surface (312) being aspheric; the second lens element (320) with negative refractive power, which is a lens made of a plastic material and having a concave object-side surface (321) and a convex image-side surface (322) proximate to the optical axis, and both object-side surface (321) and image-side surface (322) being aspheric; the third lens element (330) with positive refractive power, which is a crescent-shaped lens made of a plastic material and having a concave object-side surface (331) and a convex image-side surface (332), and both object-side surface (331) and image-side surface (332) being aspheric; the fourth lens element (340) with negative refractive power, which is a lens made of a plastic material and having a convex object-side surface (341) proximate to the optical axis and a concave image-side surface (342), and the object-side surface (341) and the image-side surface (342) being aspheric, and the image-side surface (342) having at least one inflection point; the fifth lens element (350) with positive refractive power, which is a lens made of a plastic material and having a convex object-side surface (351) proximate to the optical axis and a concave image-side surface (352), and the object-side surface (351) and the image-side surface (352) being aspheric, and the object-side surface (351) and the image-side surface (352) having at least one inflection point; an infrared filter (IR-filter) (360) made of a plate glass material without affecting the focal length of the image pickup optical system of the present invention; and an image sensor (380) installed at an image plane (370). In this preferred embodiment, the image pickup optical system further comprises an aperture stop (300) disposed between the first lens element (310) and the second lens element (320).

With reference to FIG. 13 (which shows Table 5) for optical data of this preferred embodiment, the object-side surface (311) and image-side surface (312) of the first lens element (310), the object-side surface (321) and image-side surface (322) of the second lens element (320), the object-side surface (331) and image-side surface (332) of the third lens element (330), the object-side surface (341) and image-side surface (342) of the fourth lens element (340), and the object-side surface (351) and image-side surface (352) of the fifth lens element (350) satisfy the aspherical surface formula as given in Equation (14), and FIG. 14 (which shows Table 6) lists the aspherical surface coefficients.

In the image pickup optical system of the third preferred embodiment, the focal length of the whole image pickup optical system is f=3.63 (mm), the aperture value (f-number) of the whole image pickup optical system is Fno=2.50, and half of the maximum view angle is HFOV=37.7 (degrees).

With reference to Table 5 for this preferred embodiment, if $D_{R1S}$ is the axial distance from the object-side surface (311) of the first lens element (310) to the aperture stop (300), $D_{R1R4}$ is the axial distance from the object-side surface (311) of the first lens element (310) to the image-side surface (322) of the second lens element (320), $R_3$ is the curvature radius near the optical axis of the object-side surface (321) of the second lens element (320) of the image pickup optical system, and $R_4$ is the curvature radius near the optical axis of the image-side surface (322) of the second lens element (320), they satisfy the following equations: $(R_3+R_4)/(R_3-R_4)=-1.59$, and $D_{R1S}/D_{R1R4}=0.46$.

In this preferred embodiment, if TTL is the distance from the object-side surface (311) of the first lens element (310) to the image plane (370) of the image sensor (380) along the optical axis and ImgH is half of the diagonal length of the effective photosensitive area of the image sensor (380) installed at the image plane (370), they satisfy the equation: TTL/ImgH=1.75. Now, in the image pickup optical system of this preferred embodiment, if $v_1$ is the Abbe number of the first lens element (310), $v_2$ is the Abbe number of the second lens element (320), and $v_4$ is the Abbe number of the fourth lens element (340), they satisfy the equations: $v_1-v_2=32.1$ and $v_1-v_2-v_4=8.3$. If f is the focal length of the whole image pickup optical system, $R_1$ is the curvature radius near the optical axis of the object-side surface (311) of the first lens element (310), $R_2$ is the curvature radius near the optical axis of the image-side surface (312) of the first lens element (310), and $R_3$ is the curvature radius near the optical axis of the object-side surface (321) of the second lens element (320), they satisfy the equations: $|R_2-R_3|/f=7.77$ and $R_1/f=0.52$. If f is the focal length of the whole image pickup optical system and R8 is the curvature radius near the optical axis of the image-side surface (342) of the fourth lens element, they satisfy the equation: $R_8/f=0.48$. If f is the focal length of the whole image pickup optical system, $f_3$ is the focal length of the third lens element (330), $f_4$ is the focal length of the fourth lens element (340), $f_5$ is the focal length of the fifth lens element (350), they satisfy the equation: $|f/f_3|+|f/f_4|+|f/f_5|=1.72$. If $T_{12}$ is the distance from the image-side surface (312) of the first lens element (310) to the object-side surface (321) of the second lens element (320) along the optical axis and $T_{23}$ is the distance from the image-side surface (322) of the second lens element (320) to the object-side surface (331) of the third lens element (330), the ratio of $T_{12}$ to $T_{23}$ satisfies the equation: $T_{12}/T_{23}=0.54$.

From the optical data listed in FIG. 13 (which is Table 5) and the aberration curve as shown in FIG. 3B, good compensation effects of the longitudinal spherical aberration, astigmatic field curving and distortion can be achieved by the image pickup optical system in accordance with this preferred embodiment of the present invention.

Fourth Preferred Embodiment

Figure 4A:
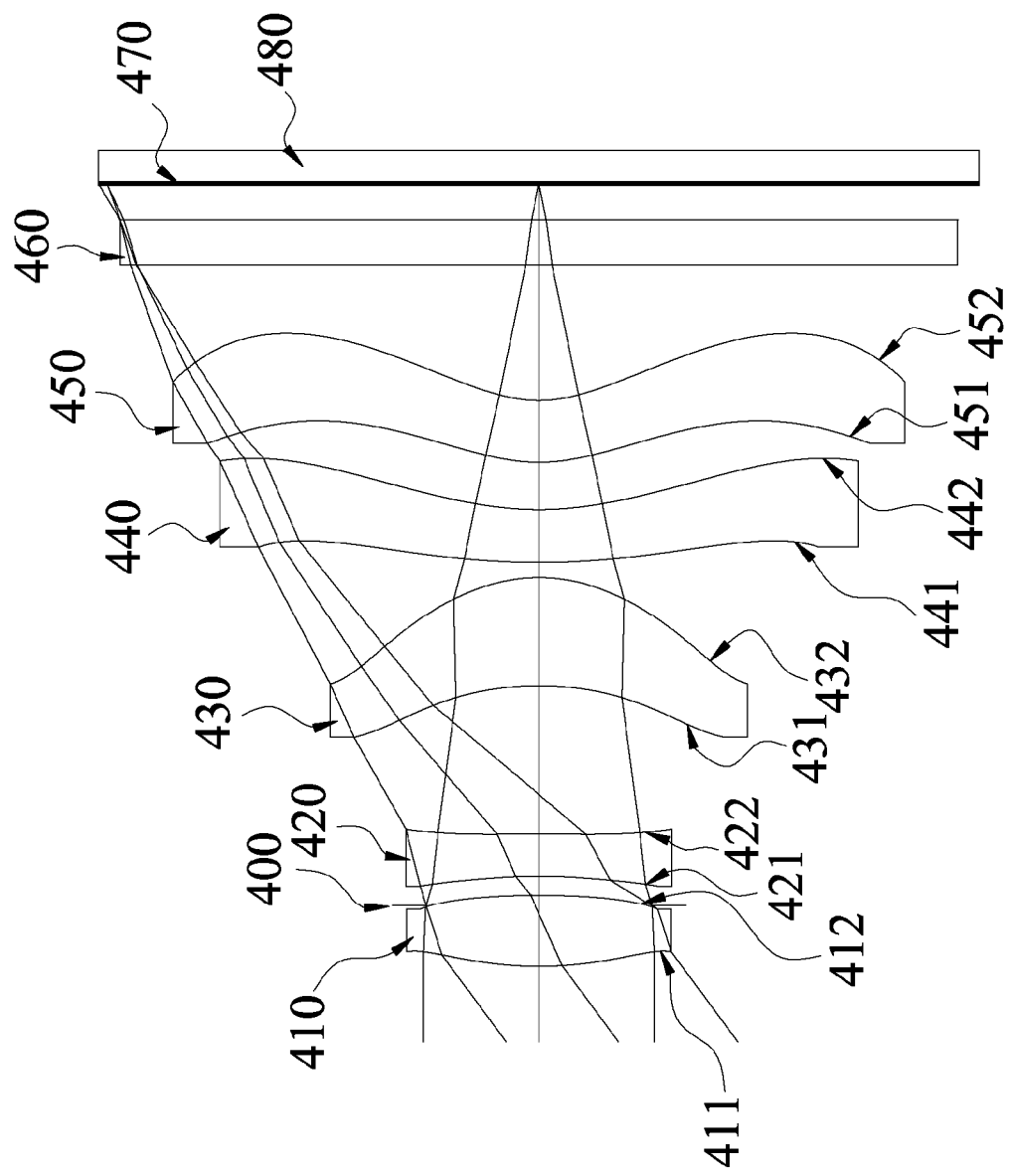
FIG. 4A is a schematic view of an optical system in accordance with the fourth preferred embodiment of the present invention.
Figure 4B:
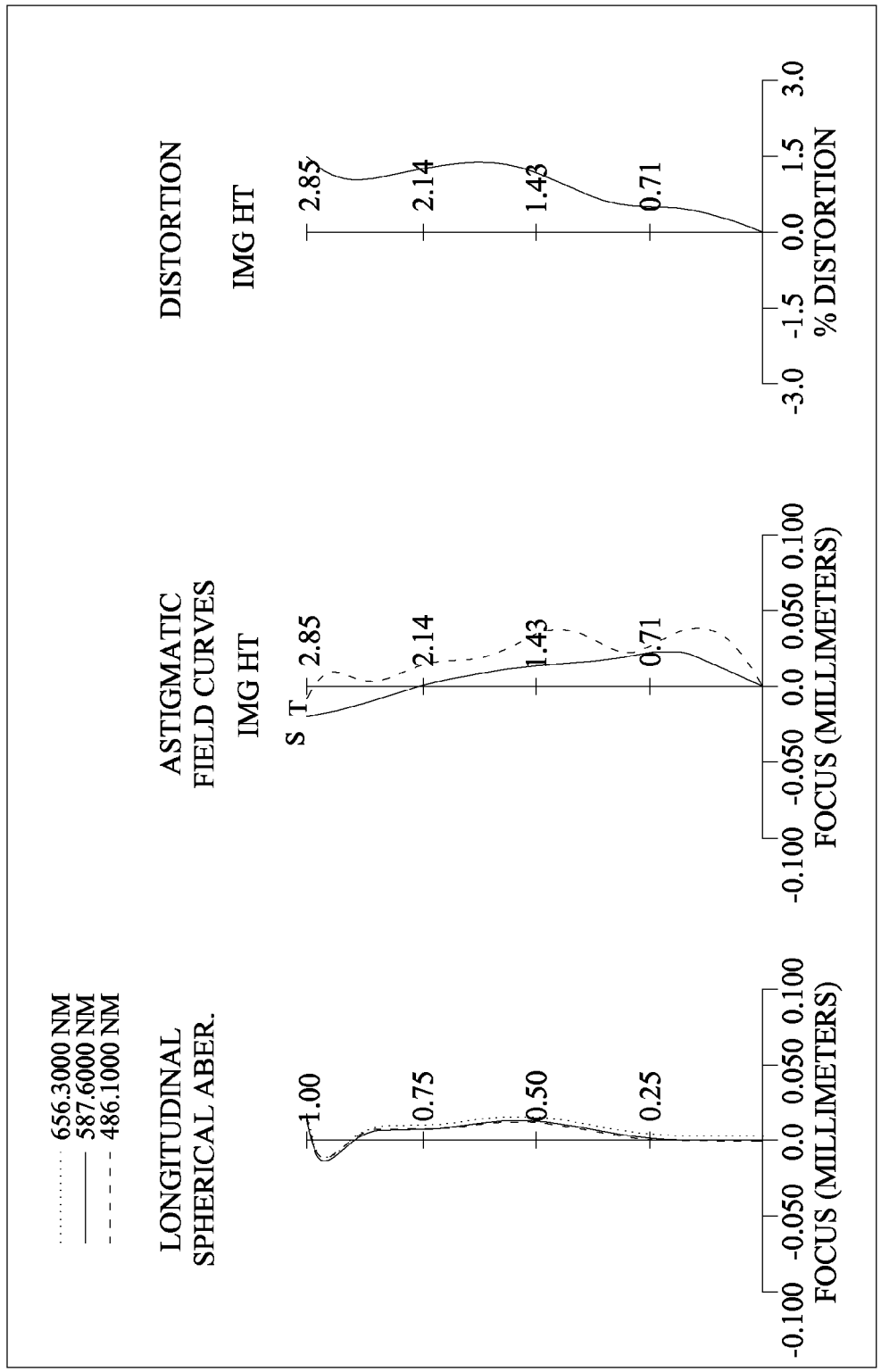
FIG. 4B is a series of aberration curves of the fourth preferred embodiment of the present invention.

With reference to FIGS. 4A and 4B for a schematic view and a series of aberration curves of an image pickup optical system in accordance with the fourth preferred embodiment of the present invention respectively, the image pickup optical system comprises five lens elements, an infrared filter (460), an aperture stop (400) and an image sensor (480). The five lens elements, sequentially arranged from an object side to an image side along an optical axis, include: the first lens element (410) with positive refractive power, which is a bi-convex lens made of a plastic material and having both object-side surface (411) and image-side surface (412) being aspheric; the second lens element (420) with negative refractive power, which is a lens made of a plastic material and having a concave object-side surface (421) and a convex image-side surface (422), and both object-side surface (421) and image-side surface (422) being aspheric, and the image-side surface (422) having at least one inflection point; the third lens element (430) with positive refractive power, which is a crescent-shaped lens made of a plastic material and having a concave object-side surface (431) and a convex image-side surface (432), and both object-side surface (431) and image-side surface (432) being aspheric; the fourth lens element (440) with negative refractive power, which is a lens made of a plastic material and having a convex object-side surface (441) proximate to an optical axis and a concave image-side surface (442), and both object-side surface (441) and image-side surface (442) being aspheric, and the image-side surface (442) having at least one inflection point; the fifth lens element (450) with negative refractive power, which is a lens made of a plastic material and having a convex object-side surface (451) proximate to the optical axis and a concave image-side surface (452), and both object-side surface (451) and image-side surface (452) being aspheric, and the object-side surface (451) and image-side surface (452) having at least one inflection point; an infrared filter (460) made of a glass material without affecting the focal length of the image pickup optical system of the present invention; and an image sensor (480) installed at an image plane (470). In this preferred embodiment, the image pickup optical system further comprises an aperture stop (400) disposed between the first lens element (410) and the second lens element (420).

With reference to FIG. 15 (which shows Table 7) for optical data of this preferred embodiment, the object-side surface (411) and image-side surface (412) of the first lens element (410), the object-side surface (421) and image-side surface (422) of the second lens element (420), the object-side surface (431) and image-side surface (432) of the third lens element (430), the object-side surface (441) and image-side surface (442) of the fourth lens element (440), and the object-side surface (451) and image-side surface (452) of the fifth lens element (450) satisfy the aspherical surface formula as given in Equation (14), and FIG. 16 (which shows Table 8) lists the aspherical surface coefficients.

In the image pickup optical system of the fourth preferred embodiment, the focal length of the whole image pickup optical system is f=3.81 (mm), the aperture value (f-number) of the whole image pickup optical system is Fno=2.50, and half of the maximum view angle is HFOV=36.4 (degrees).

With reference to Table 7 for this preferred embodiment, if $D_{R1S}$ is the axial distance from the object-side surface (411) of the first lens element (410) to the aperture stop (400), $D_{R1R4}$ is the axial distance from the object-side surface (411) of the first lens element (410) to the image-side surface (422) of the second lens element (420), $R_3$ is the curvature radius near the optical axis of the object-side surface (421) of the second lens element (420) of the image pickup optical system, and $R_4$ is the curvature radius near the optical axis of the image-side surface (422) of the second lens element (420), they satisfy the following equations: $(R_3+R_4)/(R_3-R_4)=-1.47$, and $D_{R1S}/D_{R1R4}=0.46$.

In this preferred embodiment, if TTL is the distance from the object-side surface (411) of the first lens element (410) to the image plane (470) of the image sensor (480) along the optical axis and ImgH is half of the diagonal length of the effective photosensitive area of the image sensor (480) installed at the image plane (470), they satisfy the equation: TTL/ImgH=1.78. Now, in the image pickup optical system of this preferred embodiment, if $v_1$ is the Abbe number of the first lens element (410), $v_2$ is the Abbe number of the second lens element (420), and $v_4$ is the Abbe number of the fourth lens element (440), they satisfy the equations: $v_1-v_2=32.1$ and $v_1-v_2-v_4=8.3$. If f is the focal length of the whole image pickup optical system, $R_1$ is the curvature radius near the optical axis of the object-side surface (411) of the first lens element (410), $R_2$ is the curvature radius near the optical axis of the image-side surface (412) of the first lens element (410), and $R_3$ is the curvature radius near the optical axis of the object-side surface (421) of the second lens element (420), they satisfy the equations: $|R_2-R_3|/f=0.45$ and $R_1/f=0.65$. If f is the focal length of the whole image pickup optical system and R8 is the curvature radius near the optical axis of the image-side surface (442) of the fourth lens element, they satisfy the equation: $R_8/f=0.56$. If f is the focal length of the whole image pickup optical system, $f_3$ is the focal length of the third lens element (430), $f_4$ is the focal length of the fourth lens element (440), $f_5$ is the focal length of the fifth lens element (450), they satisfy the equation: $|f/f_3|+|f/f_4|+|f/f_5|=2.0$. If $T_{12}$ is the distance from the image-side surface (412) of the first lens element (410) to the object-side surface (421) of the second lens element (420) along the optical axis and $T_{23}$ is the distance from the image-side surface (422) of the second lens element (420) to the object-side surface (431) of the third lens element (430), the ratio of $T_{12}$ to $T_{23}$ satisfies the equation: $T_{12}/T_{23}=0.13$.

From the optical data listed in FIG. 15 (which is Table 7) and the aberration curve as shown in FIG. 4B, good compensation effects of the longitudinal spherical aberration, astigmatic field curving and distortion can be achieved by the image pickup optical system in accordance with this preferred embodiment of the present invention.

Fifth Preferred Embodiment

Figure 5A:
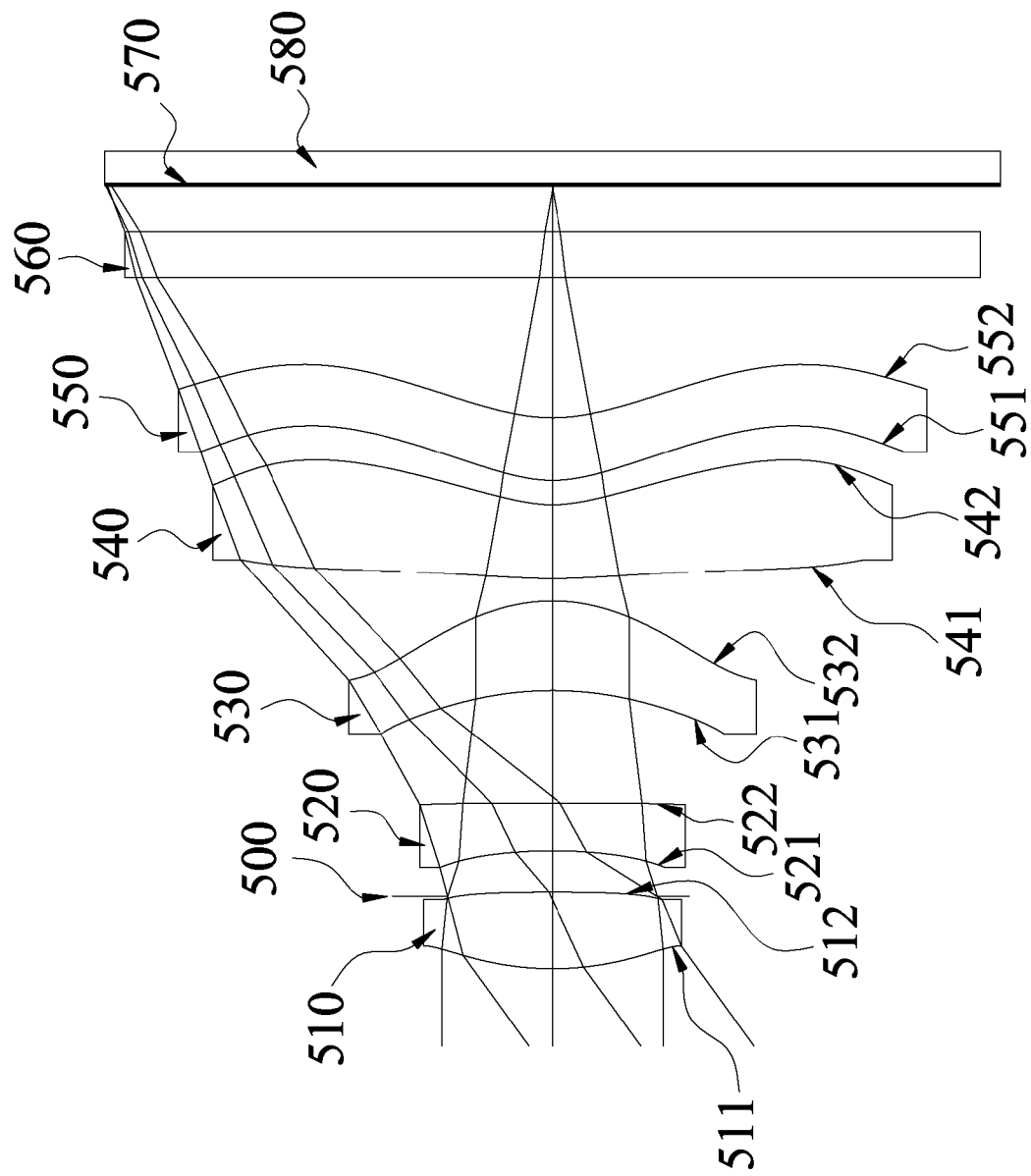
FIG. 5A is a schematic view of an optical system in accordance with the fifth preferred embodiment of the present invention.
Figure 5B:
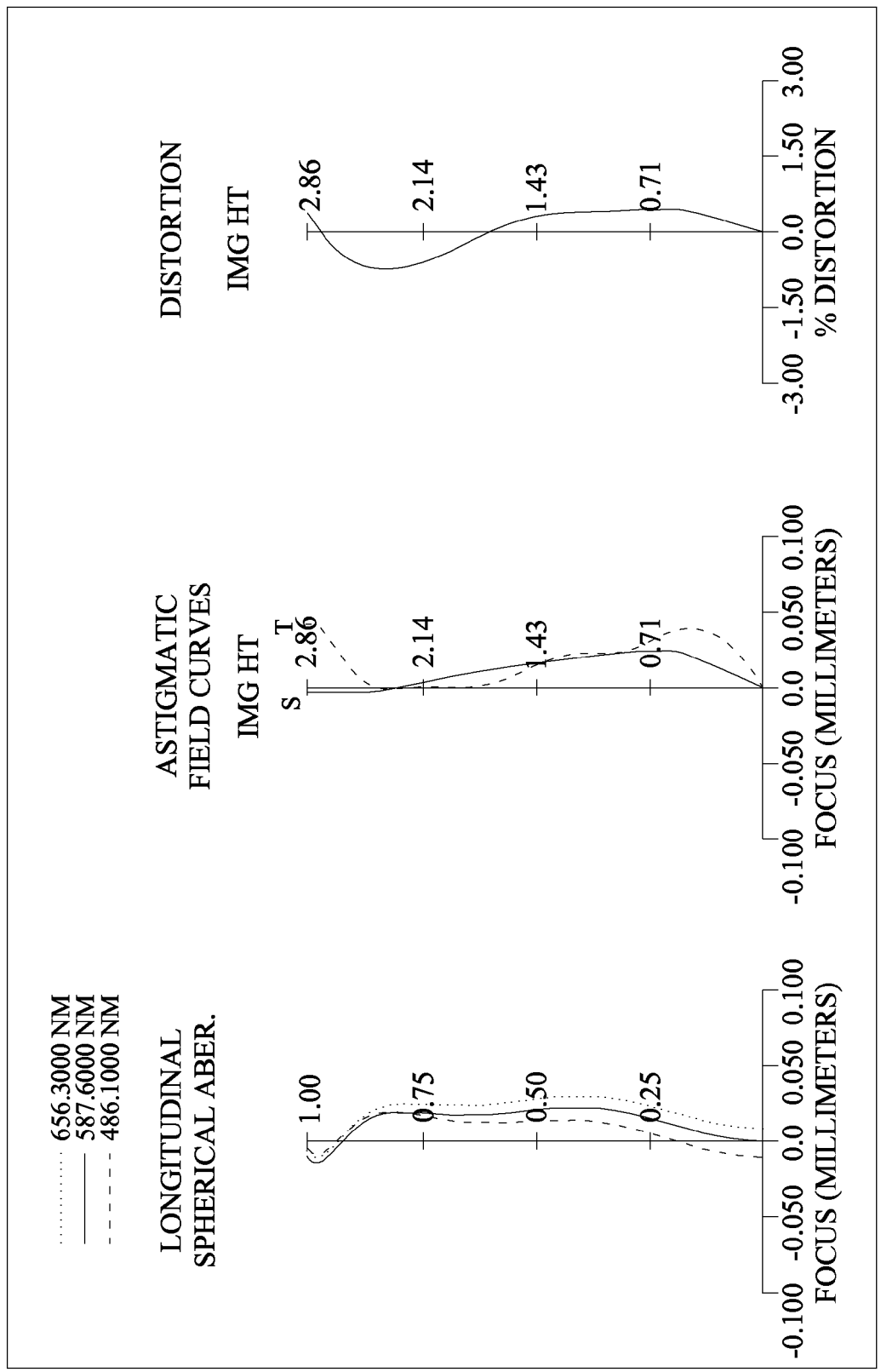
FIG. 5B is a series of aberration curves of the fifth preferred embodiment of the present invention.

With reference to FIGS. 5A and 5B for a schematic view and a series of aberration curves of an image pickup optical system in accordance with the fifth preferred embodiment of the present invention respectively, the image pickup optical system comprises five lens elements, an infrared filter (560), an aperture stop (500) and an image sensor (580). The five lens elements, sequentially arranged from an object side to an image side along an optical axis, include: the first lens element (510) with positive refractive power, which is a biconvex lens made of a plastic material and having both object-side surface (511) and image-side surface (512) being aspheric; the second lens element (520) with negative refractive power, which is a lens made of a plastic material and having a concave object-side surface (521) and a convex image-side surface (522), and both object-side surface (521) and image-side surface (522) being aspheric, and the image-side surface (522) having at least one inflection point; the third lens element (530) with positive refractive power, which is a lens made of a plastic material and having a concave object-side surface (531) and a convex image-side surface (532), and both object-side surface (531) and image-side surface (532) being aspheric; the fourth lens element (540) with negative refractive power, which is a lens made of a plastic material and having a convex object-side surface (541) proximate to an optical axis and a concave image-side surface (542), and both object-side surface (541) and image-side surface (542) being aspheric, and the image-side surface (542) having at least one inflection point; the fifth lens element (550) with positive refractive power, which is a lens made of a plastic material and having a convex object-side surface (551) proximate to the optical axis and a concave image-side surface (552), and both object-side surface (551) and image-side surface (552) being aspheric, and the object-side surface (551) and image-side surface (552) having at least one inflection point; an infrared filter (560) made of a glass material without affecting the focal length of the image pickup optical system of the present invention; and an image sensor (580) installed at an image plane (570). In this preferred embodiment, the image pickup optical system further comprises an aperture stop (500) disposed between the first lens element (510) and the second lens element (520).

With reference to FIG. 17 (which shows Table 9) for optical data of this preferred embodiment, the object-side surface (511) and image-side surface (512) of the first lens element (510), the object-side surface (521) and image-side surface (522) of the second lens element (520), the object-side surface (531) and image-side surface (532) of the third lens element (530), the object-side surface (541) and image-side surface (542) of the fourth lens element (540), and the object-side surface (551) and image-side surface (552) of the fifth lens element (550) satisfy the aspherical surface formula as given in Equation (14), and FIG. 18 (which shows Table 10) lists the aspherical surface coefficients.

In the image pickup optical system of the fifth preferred embodiment, the focal length of the whole image pickup optical system is f=3.95 (mm), the aperture value (f-number) of the whole image pickup optical system is Fno=2.80, and half of the maximum view angle is HFOV=35.7 (degrees).

With reference to Table 9 for this preferred embodiment, if $D_{R1S}$ is the axial distance from the object-side surface (511) of the first lens element (510) to the aperture stop (500), $D_{R1R4}$ is the axial distance from the object-side surface (511) of the first lens element (510) to the image-side surface (522) of the second lens element (520), $R_3$ is the curvature radius near the optical axis of the object-side surface (521) of the second lens element (520) of the image pickup optical system, and $R_4$ is the curvature radius near the optical axis of the image-side surface (522) of the second lens element (520), they satisfy the following equations: $(R_3+R_4)/(R_3-R_4)=-1.30$, and $D_{R1S}/D_{R1R4}=0.44$.

In this preferred embodiment, if TTL is the distance from the object-side surface (511) of the first lens element (510) to the image plane (570) of the image sensor (580) along the optical axis and ImgH is half of the diagonal length of the effective photosensitive area of the image sensor (580) installed at the image plane (570), they satisfy the equation: TTL/ImgH=1.73. Now, in the image pickup optical system of this preferred embodiment, if $v_1$ is the Abbe number of the first lens element (510), $v_2$ is the Abbe number of the second lens element (520), and $v_4$ is the Abbe number of the fourth lens element (540), they satisfy the equations: $v_1-v_2=32.5$ and $v_1-v_2-v_4=-23.3$. If f is the focal length of the whole image pickup optical system, $R_1$ is the curvature radius near the optical axis of the object-side surface (511) of the first lens element (510), $R_2$ is the curvature radius near the optical axis of the image-side surface (512) of the first lens element (510), and $R_3$ is the curvature radius near the optical axis of the object-side surface (521) of the second lens element (520), they satisfy the equations: $|R_2-R_3|/f=2.60$ and $R_1/f=0.48$. If f is the focal length of the whole image pickup optical system and R8 is the curvature radius near the optical axis of the image-side surface (542) of the fourth lens element, they satisfy the equation: $R_8/f=0.21$. If f is the focal length of the whole image pickup optical system, $f_3$ is the focal length of the third lens element (530), $f_4$ is the focal length of the fourth lens element (540), $f_5$ is the focal length of the fifth lens element (550), they satisfy the equation: $|f/f_3|+|f/f_4|+|f/f_5|=3.86$. If $T_{12}$ is the distance from the image-side surface (512) of the first lens element (510) to the object-side surface (521) of the second lens element (520) along the optical axis and $T_{23}$ is the distance from the image-side surface (522) of the second lens element (520) to the object-side surface (531) of the third lens element (530), the ratio of $T_{12}$ to $T_{23}$ satisfies the equation: $T_{12}/T_{23}=0.37$.

From the optical data listed in FIG. 17 (which is Table 9) and the aberration curve as shown in FIG. 5B, good compensation effects of the longitudinal spherical aberration, astigmatic field curving and distortion can be achieved by the image pickup optical system in accordance with this preferred embodiment of the present invention.

Sixth Preferred Embodiment

Figure 6A:
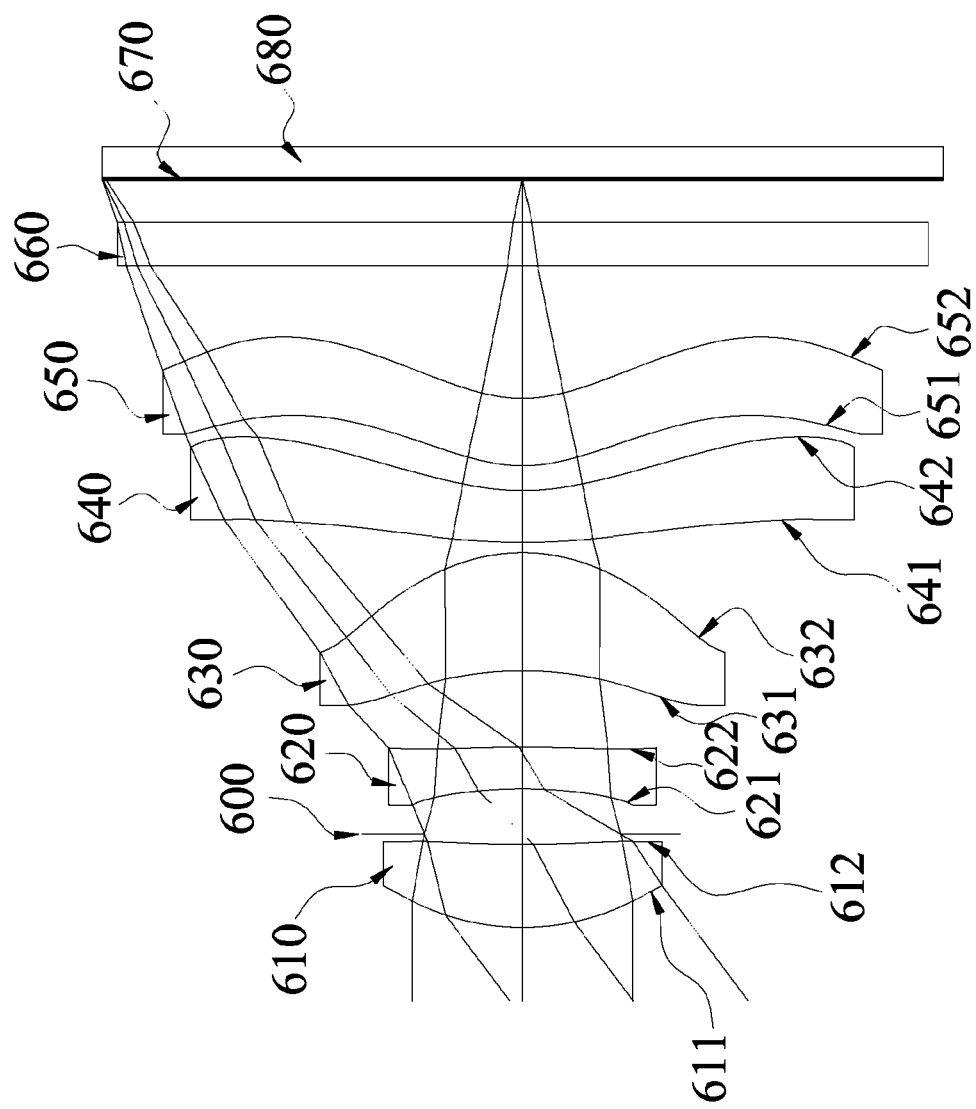
FIG. 6A is a schematic view of an optical system in accordance with the sixth preferred embodiment of the present invention.
Figure 6B:
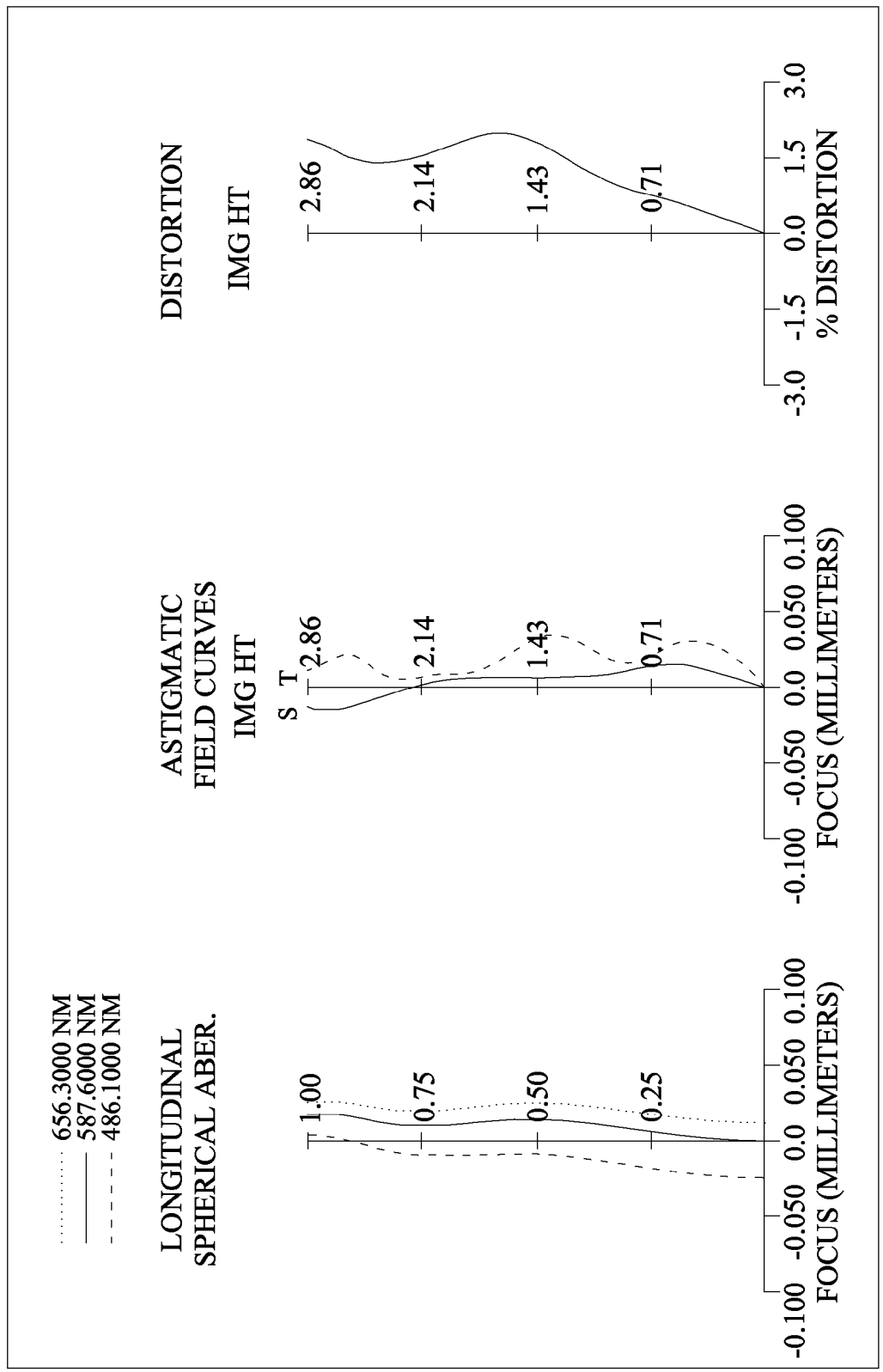
FIG. 6B is a series of aberration curves of the sixth preferred embodiment of the present invention.

With reference to FIGS. 6A and 6B for a schematic view and a series of aberration curves of an image pickup optical system in accordance with the sixth preferred embodiment of the present invention respectively, the image pickup optical system comprises five lens elements, an infrared filter (660), an aperture stop (600) and an image sensor (680). The five lens elements, sequentially arranged from an object side to an image side along an optical axis, include: the first lens element (610) with positive refractive power, which is a lens made of a plastic material and having a convex object-side surface (611) and a concave image-side surface (612) proximate to the optical axis, and both object-side surface (611) and image-side surface (612) being aspheric; the second lens element (620) with negative refractive power, which is a lens made of a plastic material and having a concave object-side surface (621) and a convex image-side surface (622) proximate to the optical axis, and both object-side surface (621) and image-side surface (622) being aspheric, and the image-side surface (622) having at least one inflection point; the third lens element (630) with positive refractive power, which is a lens made of a plastic material and having a concave object-side surface (631) and a convex image-side surface (632), and both object-side surface (631) and image-side surface (632) being aspheric; the fourth lens element (640) with negative refractive power, which is a lens made of a plastic material and having a convex object-side surface (641) proximate to an optical axis and a concave image-side surface (642), and both object-side surface (641) and image-side surface (642) being aspheric, and the image-side surface (642) having at least one inflection point; the fifth lens element (650) with negative refractive power, which is a lens made of a plastic material and having a convex object-side surface (651) proximate to the optical axis and a concave image-side surface (652), and both object-side surface (651) and image-side surface (652) being aspheric, and the object-side surface (651) and image-side surface (652) having at least one inflection point; an infrared filter (660) made of a glass material without affecting the focal length of the image pickup optical system of the present invention; and an image sensor (680) installed at an image plane (670). In this preferred embodiment, the image pickup optical system further comprises an aperture stop (600) disposed between the first lens element (610) and the second lens element (620).

With reference to FIG. 19 (which shows Table 11) for optical data of this preferred embodiment, the object-side surface (611) and image-side surface (612) of the first lens element (610), the object-side surface (621) and image-side surface (622) of the second lens element (620), the object-side surface (631) and image-side surface (632) of the third lens element (630), the object-side surface (641) and image-side surface (642) of the fourth lens element (640), and the object-side surface (651) and image-side surface (652) of the fifth lens element (650) satisfy the aspherical surface formula as given in Equation (14), and FIG. 20 (which shows Table 12) lists the aspherical surface coefficients.

In the image pickup optical system of the sixth preferred embodiment, the focal length of the whole image pickup optical system is f=3.73 (mm), the aperture value (f-number) of the whole image pickup optical system is Fno=2.50, and half of the maximum view angle is HFOV=36.9 (degrees).

With reference to Table 11 for this preferred embodiment, if $D_{R1S}$ is the axial distance from the object-side surface (611) of the first lens element (610) to the aperture stop (600), $D_{R1R4}$ is the axial distance from the object-side surface (611) of the first lens element (610) to the image-side surface (622) of the second lens element (620), $R_3$ is the curvature radius near the optical axis of the object-side surface (621) of the second lens element (620) of the image pickup optical system, and $R_4$ is the curvature radius near the optical axis of the image-side surface (622) of the second lens element (620), they satisfy the following equations: $(R_3+R_4)/(R_3-R_4)=-2.48$, and $D_{R1S}/D_{R1R4}=0.52$.

In this preferred embodiment, if TTL is the distance from the object-side surface (611) of the first lens element (610) to the image plane (670) of the image sensor (680) along the optical axis and ImgH is half of the diagonal length of the effective photosensitive area of the image sensor (680) installed at the image plane (670), they satisfy the equation: TTL/ImgH=1.75. Now, in the image pickup optical system of this preferred embodiment, if $v_1$ is the Abbe number of the first lens element (610), $v_2$ is the Abbe number of the second lens element (620), and $v_4$ is the Abbe number of the fourth lens element (640), they satisfy the equations: $v_1-v_2=32.1$ and $v_1-v_2-v_4=-23.8$. If f is the focal length of the whole image pickup optical system, $R_1$ is the curvature radius near the optical axis of the object-side surface (611) of the first lens element (610), $R_2$ is the curvature radius near the optical axis of the image-side surface (612) of the first lens element (610), and $R_3$ is the curvature radius near the optical axis of the object-side surface (621) of the second lens element (620), they satisfy the equations: $|R_2-R_3|/f=3.21$ and $R_1/f=0.45$. If f is the focal length of the whole image pickup optical system and R8 is the curvature radius near the optical axis of the image-side surface (642) of the fourth lens element, they satisfy the equation: $R_8/f=0.42$. If f is the focal length of the whole image pickup optical system, $f_3$ is the focal length of the third lens element (630), $f_4$ is the focal length of the fourth lens element (640), $f_5$ is the focal length of the fifth lens element (650), they satisfy the equation: $|f/f_3|+|f/f_4|+|f/f_5|=2.03$. If $T_{12}$ is the distance from the image-side surface (612) of the first lens element (610) to the object-side surface (621) of the second lens element (620) along the optical axis and T23 is the distance from the image-side surface (622) of the second lens element (620) to the object-side surface (631) of the third lens element (630), the ratio of $T_{12}$ to $T_{23}$ satisfies the equation: $T_{12}/T_{23}=0.72$.

From the optical data listed in FIG. 19 (which is Table 11) and the aberration curve as shown in FIG. 6B, good compensation effects of the longitudinal spherical aberration, astigmatic field curving and distortion can be achieved by the image pickup optical system in accordance with this preferred embodiment of the present invention.

Seventh Preferred Embodiment

Figure 7B:
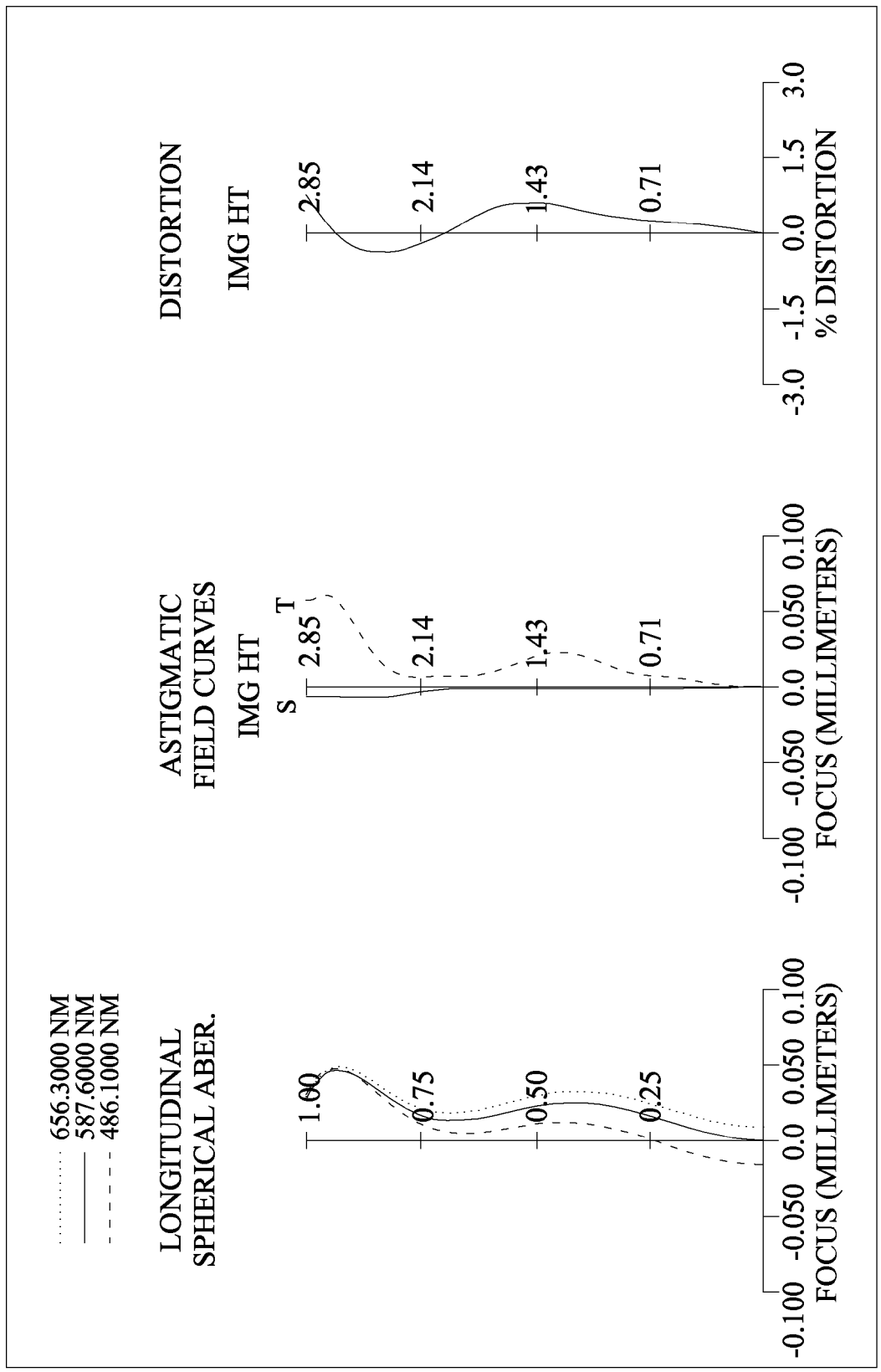
FIG. 7B is a series of aberration curves of the seventh preferred embodiment of the present invention.

With reference to FIGS. 7A and 7B for a schematic view and a series of aberration curves of an image pickup optical system in accordance with the seventh preferred embodiment of the present invention respectively, the image pickup optical system comprises five lens elements, an infrared filter (760), an aperture stop (700) and an image sensor (780). The five lens elements, sequentially arranged from an object side to an image side along an optical axis, include: the first lens element (710) with positive refractive power, which is a biconvex lens made of a plastic material and having both object-side surface (711) and image-side surface (712) being aspheric; the second lens element (720) with negative refractive power, which is a lens made of a plastic material and having a concave object-side surface (721) and a convex image-side surface (722), and both object-side surface (721) and image-side surface (722) being aspheric; the third lens element (730) with positive refractive power, which is a lens made of a plastic material and having a concave object-side surface (731) and a convex image-side surface (732), and both object-side surface (731) and image-side surface (732) being aspheric; the fourth lens element (740) with negative refractive power, which is a lens made of a plastic material and having a convex object-side surface (741) proximate to an optical axis and a concave image-side surface (742), and both object-side surface (741) and image-side surface (742) being aspheric, and the image-side surface (742) having at least one inflection point; the fifth lens element (750) with positive refractive power, which is a lens made of a plastic material and having a convex object-side surface (751) proximate to the optical axis and a concave image-side surface (752), and both object-side surface (751) and image-side surface (752) being aspheric, and the object-side surface (751) and image-side surface (752) having at least one inflection point; an infrared filter (760) made of a glass material without affecting the focal length of the image pickup optical system of the present invention; and an image sensor (780) installed at an image plane (770). In this preferred embodiment, the image pickup optical system further comprises an aperture stop (700) disposed between the first lens element (710) and the second lens element (720).

With reference to FIG. 21 (which shows Table 13) for optical data of this preferred embodiment, the object-side surface (711) and image-side surface (712) of the first lens element (710), the object-side surface (721) and image-side surface (722) of the second lens element (720), the object-side surface (731) and image-side surface (732) of the third lens element (730), the object-side surface (741) and image-side surface (742) of the fourth lens element (740), and the object-side surface (751) and image-side surface (752) of the fifth lens element (750) satisfy the aspherical surface formula as given in Equation (14), and FIG. 22 (which shows Table 14) lists the aspherical surface coefficients.

In the image pickup optical system of the seventh preferred embodiment, the focal length of the whole image pickup optical system is f=3.68 (mm), the aperture value (f-number) of the whole image pickup optical system is Fno=2.70, and half of the maximum view angle is HFOV=37.5 (degrees).

With reference to Table 13 for this preferred embodiment, if $D_{R1S}$ is the axial distance from the object-side surface (711) of the first lens element (710) to the aperture stop (700), $D_{R1R4}$ is the axial distance from the object-side surface (711) of the first lens element (710) to the image-side surface (722) of the second lens element (720), $R_3$ is the curvature radius near the optical axis of the object-side surface (721) of the second lens element (720) of the image pickup optical system, and $R_4$ is the curvature radius near the optical axis of the image-side surface (722) of the second lens element (720), they satisfy the following equations: $(R_3+R_4)/(R_3-R_4)=-2.32$, and $D_{R1S}/D_{R1R4}=0.09$.

In this preferred embodiment, if TTL is the distance from the object-side surface (711) of the first lens element (710) to the image plane (770) of the image sensor (780) along the optical axis and ImgH is half of the diagonal length of the effective photosensitive area of the image sensor (780) installed at the image plane (770), they satisfy the equation: TTL/ImgH=1.64. Now, in the image pickup optical system of this preferred embodiment, if $v_1$ is the Abbe number of the first lens element (710), $v_2$ is the Abbe number of the second lens element (720), and $v_4$ is the Abbe number of the fourth lens element (740), they satisfy the equations: $v_1-v_2=32.1$ and $v_1-v_2-v_4=-23.8$. If f is the focal length of the whole image pickup optical system, $R_1$ is the curvature radius near the optical axis of the object-side surface (711) of the first lens element (710), $R_2$ is the curvature radius near the optical axis of the image-side surface (712) of the first lens element (710), and $R_3$ is the curvature radius near the optical axis of the object-side surface (721) of the second lens element (720), they satisfy the equations: $|R_2-R_3|/f=11.15$ and $R_1/f=0.47$. If f is the focal length of the whole image pickup optical system and $R_8$ is the curvature radius near the optical axis of the image-side surface (742) of the fourth lens element, they satisfy the equation: $R_8/f=0.4$. If f is the focal length of the whole image pickup optical system, $f_3$ is the focal length of the third lens element (730), $f_4$ is the focal length of the fourth lens element (740), $f_5$ is the focal length of the fifth lens element (650), they satisfy the equation: $|f/f_3|+|f/f_4|+|f/f_5|=3.11$. If $T_{12}$ is the distance from the image-side surface (712) of the first lens element (710) to the object-side surface (721) of the second lens element (720) along the optical axis and $T_{23}$ is the distance from the image-side surface (722) of the second lens element (720) to the object-side surface (731) of the third lens element (730), the ratio of $T_{12}$ to $T_{23}$ satisfies the equation: $T_{12}/T_{23}=0.49$.

From the optical data listed in FIG. 21 (which is Table 13) and the aberration curve as shown in FIG. 7B, good compensation effects of the longitudinal spherical aberration, astigmatic field curving and distortion can be achieved by the image pickup optical system in accordance with this preferred embodiment of the present invention.

Eighth Preferred Embodiment

Figure 8A:
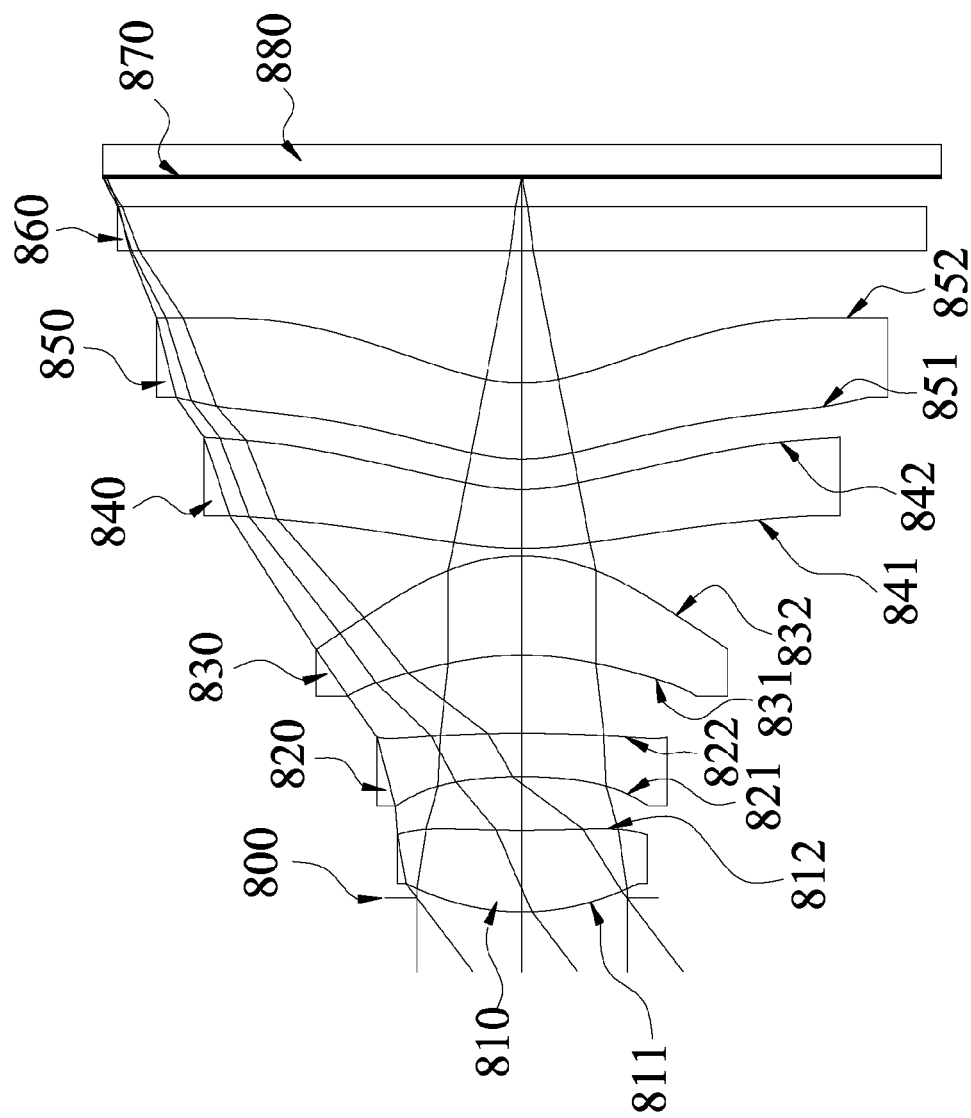
FIG. 8A is a schematic view of an optical system in accordance with the eighth preferred embodiment of the present invention.
Figure 8B:
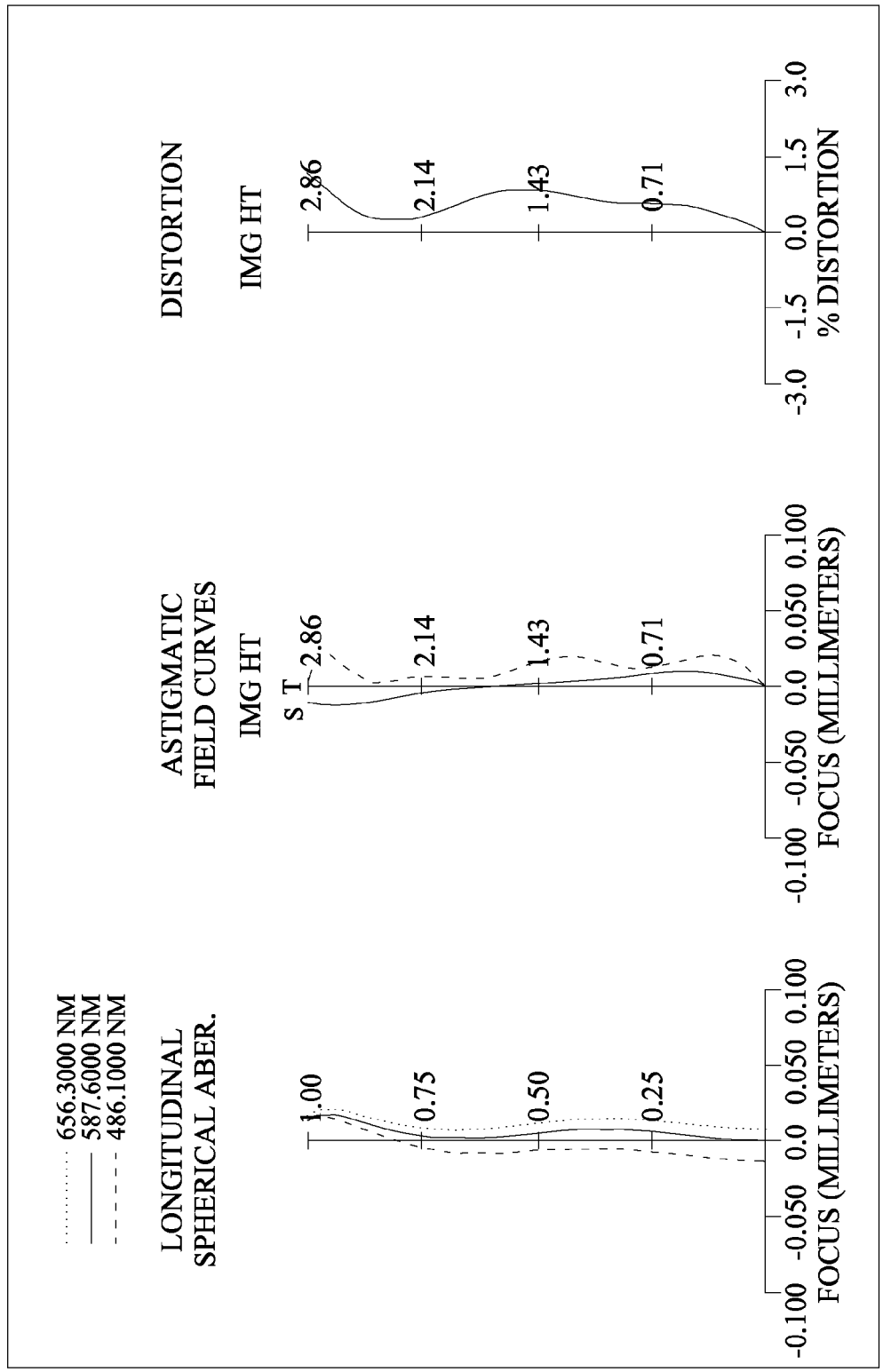
FIG. 8B is a series of aberration curves of the eighth preferred embodiment of the present invention.

With reference to FIGS. 8A and 8B for a schematic view and a series of aberration curves of an image pickup optical system in accordance with the eighth preferred embodiment of the present invention respectively, the image pickup optical system comprises five lens elements, an infrared filter (860), an aperture stop (800) and an image sensor (880). The five lens elements, sequentially arranged from an object side to an image side along an optical axis, include: the first lens element (810) with positive refractive power, which is a lens made of a plastic material and having a convex object-side surface (811) and a concave image-side surface (812) proximate to the optical axis, and both object-side surface (811) and image-side surface (812) being aspheric; the second lens element (820) with negative refractive power, which is a lens made of a plastic material and having a concave object-side surface (821) and a convex image-side surface (822), and both object-side surface (821) and image-side surface (822) being aspheric; the third lens element (830) with positive refractive power, which is a lens made of a plastic material and having a concave object-side surface (831) and a convex image-side surface (832), and both object-side surface (831) and image-side surface (832) being aspheric; the fourth lens element (840) with negative refractive power, which is a lens made of a plastic material and having a convex object-side surface (841) proximate to an optical axis and a concave image-side surface (842), and both object-side surface (841) and image-side surface (842) being aspheric, and the image-side surface (842) having at least one inflection point; the fifth lens element (850) with negative refractive power, which is a lens made of a plastic material and having a convex object-side surface (851) proximate to the optical axis and a concave image-side surface (852), and both object-side surface (851) and image-side surface (852) being aspheric, and the object-side surface (851) and image-side surface (852) having at least one inflection point; an infrared filter (860) made of a glass material without affecting the focal length of the image pickup optical system of the present invention; and an image sensor (880) installed at an image plane (870). In this preferred embodiment, the image pickup optical system further comprises an aperture stop (800) disposed between the first lens element (810) and the second lens element (820).

With reference to FIG. 23 (which shows Table 15) for optical data of this preferred embodiment, the object-side surface (811) and image-side surface (812) of the first lens element (810), the object-side surface (821) and image-side surface (822) of the second lens element (820), the object-side surface (831) and image-side surface (832) of the third lens element (830), the object-side surface (841) and image-side surface (842) of the fourth lens element (840), and the object-side surface (851) and image-side surface (852) of the fifth lens element (850) satisfy the aspherical surface formula as given in Equation (14), and FIG. 24 (which shows Table 16) lists the aspherical surface coefficients.

In the image pickup optical system of the eighth preferred embodiment, the focal length of the whole image pickup optical system is f=3.72 (mm), the aperture value (f-number) of the whole image pickup optical system is Fno=2.60, and half of the maximum view angle is HFOV=37.2 (degrees).

With reference to Table 15 for this preferred embodiment, if $D_{R1S}$ is the axial distance from the object-side surface (811) of the first lens element (810) to the aperture stop (800), $D_{R1R4}$ is the axial distance from the object-side surface (811) of the first lens element (810) to the image-side surface (822) of the second lens element (820), $R_3$ is the curvature radius near the optical axis of the object-side surface (821) of the second lens element (820) of the image pickup optical system, and $R_4$ is the curvature radius near the optical axis of the image-side surface (822) of the second lens element (820), they satisfy the following equations: $(R_3+R_4)/(R_3-R_4)=-2.28$, and $D_{R1S}/D_{R1R4}=0.08$.

In this preferred embodiment, if TTL is the distance from the object-side surface (811) of the first lens element (810) to the image plane (870) of the image sensor (880) along the optical axis and ImgH is half of the diagonal length of the effective photosensitive area of the image sensor (880) installed at the image plane (870), they satisfy the equation: TTL/ImgH=1.72. Now, in the image pickup optical system of this preferred embodiment, if $v_1$ is the Abbe number of the first lens element (810), $v_2$ is the Abbe number of the second lens element (820), and $v_4$ is the Abbe number of the fourth lens element (840), they satisfy the equations: $v_1-v_2=32.1$ and $v_1-v_2-v_4=8.3$. If f is the focal length of the whole image pickup optical system, $R_1$ is the curvature radius near the optical axis of the object-side surface (811) of the first lens element (810), $R_2$ is the curvature radius near the optical axis of the image-side surface (812) of the first lens element (810), and $R_3$ is the curvature radius near the optical axis of the object-side surface (821) of the second lens element (820), they satisfy the equations: $|R_2-R_3|/f=3.43$ and $R_1/f=0.45$. If f is the focal length of the whole image pickup optical system and $R_8$ is the curvature radius near the optical axis of the image-side surface (842) of the fourth lens element, they satisfy the equation: $R_8/f=0.35$. If f is the focal length of the whole image pickup optical system, $f_3$ is the focal length of the third lens element (830), $f_4$ is the focal length of the fourth lens element (840), $f_5$ is the focal length of the fifth lens element (850), they satisfy the equation: $|f/f_3|+|f/f_4|+|f/f_5|=1.64$. If $T_{12}$ is the distance from the image-side surface (812) of the first lens element (810) to the object-side surface (821) of the second lens element (820) along the optical axis and $T_{23}$ is the distance from the image-side surface (822) of the second lens element (820) to the object-side surface (831) of the third lens element (830), the ratio of $T_{12}$ to $T_{23}$ satisfies the equation: $T_{12}/T_{23}=0.68$.

From the optical data listed in FIG. 23 (which is Table 15) and the aberration curve as shown in FIG. 8B, good compensation effects of the longitudinal spherical aberration, astigmatic field curving and distortion can be achieved by the image pickup optical system in accordance with this preferred embodiment of the present invention.

In image pickup optical system of the present invention, the lens can be made of a glass or plastic material. If the lens is made of a glass material, the refractive power for the image pickup optical system can be selected more flexibly. If the lens is made of a plastic material, the production cost can be reduced effectively. In addition, an aspherical surface is formed on an optical surface of the lens, and the aspherical surface can be easily manufactured into a shape other than that of a spherical surface to have more control factors to eliminate or reduce aberrations, so as to reduce the number of lenses used and the total length of the image pickup optical system of the present invention.

In the image pickup optical system of the present invention, if the lens surface is a convex surface, the lens surface proximate to the axis is a convex surface; and if the lens surface is a concave surface, the lens surface proximate to the axis is a concave surface.

In the image pickup optical system of the present invention, at least one stop (such as glare stop or field stop, not shown in the figure) can be provided for reducing stray lights to facilitate improving the image quality.

Tables 1 to 16 (corresponding to FIGS. 9 to 24 respectively) show changes of values of an image pickup optical system in accordance with a preferred embodiment of the present invention. However, the changes of values in the preferred embodiments of the present invention are obtained from experiments. Even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those generally skilled in the art without departing from the scope and spirit of the invention set forth in the claims.

What is claimed is:

1. An image pickup optical system, comprising five lens elements with refractive power arranged sequentially from an object side to an image side:
  a first lens element with positive refractive power, having a convex object-side surface;
  a second lens element with negative refractive power, having a concave object-side surface and a convex image-side surface;
  a third lens element with refractive power;
  a fourth lens element with refractive power, having a concave image-side surface, and at least one of an object-side surface and the image-side surface being aspheric;
  a fifth lens element with refractive power, having a concave image-side surface, and at least one of an object-side surface and the image-side surface being aspheric, and at least one of the object-side and image-side surfaces including at least one inflection point; and the image pickup optical system further comprising a stop;
  wherein $R_3$ is a curvature radius of the object-side surface of the second lens element, $R_4$ is a curvature radius of the image-side surface of the second lens element, $D_{R1S}$ is an axial distance from the object-side surface of the first lens element to the stop, $D_{R1R4}$ is an axial distance from the object-side surface of the first lens element to the image-side surface of the second lens element; and the following relations are satisfied:

$$-4.5 < (R_3+R_4)/(R_3-R_4) < -1.0;$$

$$0.25 < D_{R1S}/D_{R1R4} < 1.20.$$

2. The image pickup optical system of claim 1, wherein the object-side surface of the third lens element is concave, and the image-side surface of the third lens element is convex.

3. The image pickup optical system of claim 2, wherein the third lens element has positive refractive power.

4. The image pickup optical system of claim 3, wherein the fourth lens element has negative refractive power, and the fifth lens element is made of a plastic material.

5. The image pickup optical system of claim 4, wherein at least one of the objective-side surface and the image-side surface of the fourth lens element includes at least one inflection point, and the fourth lens element is made of a plastic material.

6. The image pickup optical system of claim 4, wherein $R_3$ is the curvature radius of the object-side surface of the second lens element, $R_4$ is the curvature radius of the image-side surface of the second lens element, and preferably the following relation is satisfied:

$$-3.0 < (R_3+R_4)/(R_3-R_4) < -1.0.$$

7. The image pickup optical system of claim 6, wherein $v_1$ is an Abbe number of the first lens element, $v_2$ is an Abbe number of the second lens element, and the following relation is satisfied:

$$28 < v_1 - v_2 < 45.$$

8. The image pickup optical system of claim 6, wherein $R_2$ is a curvature radius of the image-side surface of the first lens element, $R_3$ is the curvature radius of the object-side surface of the second lens element, f is a focal length of the image pickup optical system, and the following relation is satisfied:

$$|R_2 - R_3|/f > 1.0.$$

9. The image pickup optical system of claim 6, wherein $R_1$ is a curvature radius of the object-side surface of the first lens element, f is a focal length of the image pickup optical system, and the following relation is satisfied:

$$0.35 < R_1/f < 0.50.$$

10. The image pickup optical system of claim 6, wherein f is a focal length of the image pickup optical system, $f_3$ is a focal length of the third lens element, $f_4$ is a focal length of the fourth lens element, $f_5$ is a focal length of the fifth lens element, and the following relation is satisfied:

$$1.20 < |f/f_3| + |f/f_4| + |f/f_5| < 2.70.$$

11. The image pickup optical system of claim 6, wherein the object-side surface of the fifth lens element is convex.

12. The image pickup optical system of claim 5, wherein $v_1$ is an Abbe number of the first lens element, $v_2$ is an Abbe number of the second lens element, $v_4$ is an Abbe number of the fourth lens element, and the following relation is satisfied:

$$-10 < v_1 - v_2 - v_4 < 20.$$

13. The image pickup optical system of claim 5, wherein $T_{12}$ is an axial distance between the first lens element and the second lens element, $T_{23}$ is an axial distance between the second lens element and the third lens element, and the following relation is satisfied:

$$0.05 < T_{12}/T_{23} < 0.82.$$

14. The image pickup optical system of claim 5, wherein $R_3$ is the curvature radius of the object-side surface of the second lens element, $R_4$ is the curvature radius of the image-side surface of the second lens element, and preferably the following relation is satisfied:

$$-2.3 < (R_3+R_4)/(R_3-R_4) < -1.0.$$

15. The image pickup optical system of claim 1, further comprising an image sensor at an image plane, wherein TTL is an axial distance from the object-side surface of the first lens element to the image plane, ImgH is a half of the diagonal length of an effective photosensitive area of the image sensor, and the following relation is satisfied:

$$TTL/ImgH < 2.0.$$

16. An image pickup optical system, comprising five lens elements with refractive power arranged sequentially from an object side to an image side:
  a first lens element with positive refractive power, having a convex object-side surface;
  a second lens element with negative refractive power, having a concave object-side surface and a convex image-side surface;
  a third lens element with refractive power, having a concave object-side surface and a convex image-side surface;
  a fourth lens element with refractive power, having a concave image-side surface, and at least one of an object-side surface and the image-side surface being aspheric;
  a fifth lens element with refractive power, having a concave image-side surface, and at least one of an object-side surface and the image-side surface being aspheric, and at least one of the object-side and image-side surfaces including at least one inflection point;
  wherein $R_3$ is a curvature radius of the object-side surface of the second lens element, $R_4$ is a curvature radius of the image-side surface of the second lens element, $T_{12}$ is an axial distance between the first lens element and the second lens element, $T_{23}$ is an axial distance between the second lens element and the third lens element, and the following relations are satisfied:

$$-4.5<(R_3+R_4)/(R_3-R_4)<-1.0;$$

$$0.05<T_{12}/T_{23}<0.82.$$

17. The image pickup optical system of claim 16, wherein third lens element has positive refractive power.

18. The image pickup optical system of claim 17, wherein the fourth lens element has negative refractive power, and the fifth lens element is made of a plastic material.

19. The image pickup optical system of claim 18, wherein $R_3$ is the curvature radius of the object-side surface of the second lens element, $R_4$ is the curvature radius of the image-side surface of the second lens element, and preferably the following relation is satisfied:

$$-3.0<(R_3+R_4)/(R_3-R_4)<-1.0.$$

20. The image pickup optical system of claim 19, wherein $R_3$ is the curvature radius of the object-side surface of the second lens element, $R_4$ is the curvature radius of the image-side surface of the second lens element; and preferably the following relation is satisfied:

$$-2.3<(R_3+R_4)/(R_3-R_4)<-1.0.$$

21. The image pickup optical system of claim 19, wherein $R_2$ is a curvature radius of the image-side surface of the first lens element, $R_3$ is the curvature radius of the object-side surface of the second lens element, f is a focal length of the image pickup optical system, and the following relation is satisfied:

$$|R_2-R_3|/f>1.0.$$

22. The image pickup optical system of claim 19, wherein $v_1$ is an Abbe number of the first lens element, $v_2$ is an Abbe number of the second lens element, and the following relation is satisfied:

$$28<v_1-v_2<45.$$

23. The image pickup optical system of claim 22, wherein f is a focal length of the image pickup optical system, $f_3$ is a focal length of the third lens element, $f_4$ is a focal length of the fourth lens element, $f_5$ is a focal length of the fifth lens element, and the following relation is satisfied:

$$1.20<|f/f_3|+|f/f_4|+|f/f_5|<2.70.$$

24. The image pickup optical system of claim 22, wherein the object-side surface of the fifth lens element is convex.

25. The image pickup optical system of claim 22, wherein $R_8$ is a curvature radius of the image-side surface of the fourth lens element, f is a focal length of the image pickup optical system, and the following relation is satisfied:

$$0<R_8/f<0.9.$$

26. The image pickup optical system of claim 18, further comprising an image sensor at an image plane, wherein TTL is an axial distance from the object-side surface of the first lens element to the image plane, ImgH is a half of the diagonal length of an effective photosensitive area of the image sensor, and the following relation is satisfied:

$$TTL/ImgH<2.0.$$

* * * * *

UNITED STATES PATENT AND TRADEMARK OFFICE
CERTIFICATE OF CORRECTION

PATENT NO. : 8,488,255 B2  
APPLICATION NO. : 13/182896  
DATED : July 16, 2013  
INVENTOR(S) : Tsung-Han Tsai Page 1 of 2

It is certified that error appears in the above-identified patent and that said Letters Patent is hereby corrected as shown below:

In the Drawings:

FIG. 5A should read:

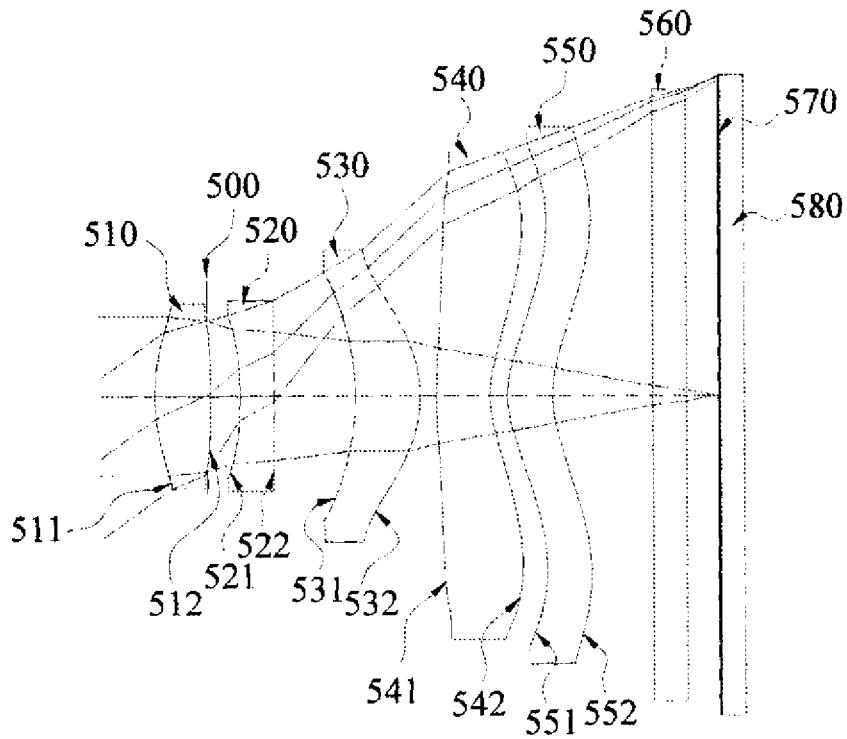

FIG. 5A

Signed and Sealed this  
Twenty-ninth Day of October, 2013

Teresa Stanek Rea  
*Deputy Director of the United States Patent and Trademark Office*

CERTIFICATE OF CORRECTION (continued)

U.S. Pat. No. 8,488,255 B2

FIG. 7A should read:

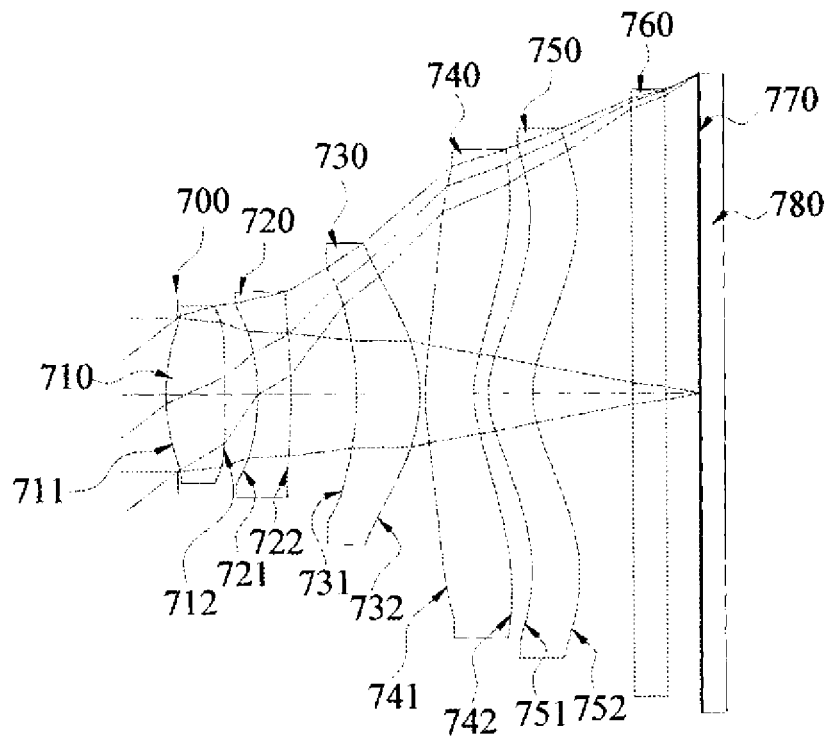

FIG. 7A